United States Patent
Prusko et al.

(10) Patent No.: US 11,858,699 B2
(45) Date of Patent: Jan. 2, 2024

(54) DISPENSING CLOSURE FOR A CONTAINER

(71) Applicant: AptarGroup, Inc., Crystal Lake, IL (US)

(72) Inventors: Curt Prusko, Wauwatosa, WI (US); Kenneth Phillips, Mukwonago, WI (US); Timothy Spiegelhoff, Burlington, WI (US)

(73) Assignee: AptarGroup, Inc., Crystal Lake, IL (US)

( * ) Notice: Subject to any disclaimer, the term of this patent is extended or adjusted under 35 U.S.C. 154(b) by 819 days.

(21) Appl. No.: 16/967,847

(22) PCT Filed: Feb. 9, 2018

(86) PCT No.: PCT/US2018/017576
§ 371 (c)(1),
(2) Date: Aug. 6, 2020

(87) PCT Pub. No.: WO2019/156677
PCT Pub. Date: Aug. 15, 2019

(65) Prior Publication Data
US 2021/0047086 A1    Feb. 18, 2021

(51) Int. Cl.
*B65D 47/20*    (2006.01)
*B65D 47/40*    (2006.01)
(Continued)

(52) U.S. Cl.
CPC ..... *B65D 47/2031* (2013.01); *B65D 47/0823* (2013.01); *B65D 47/40* (2013.01);
(Continued)

(58) Field of Classification Search
CPC ............ B65D 47/2031; B65D 47/0823; B65D 47/40; B65D 47/0804; B65D 47/2025;
(Continued)

(56) References Cited

U.S. PATENT DOCUMENTS 3,400,866 A * 9/1968 Fattori ............... B65D 47/2025
222/546
3,972,452 A    8/1976 Welsh
(Continued)

FOREIGN PATENT DOCUMENTS

GB    2059399 A    4/1981
WO    2006086835 A1    8/2006

OTHER PUBLICATIONS

International Search Report and Written Opinion dated May 4, 2018.

*Primary Examiner* — John Bastianelli
(74) *Attorney, Agent, or Firm* — Wood, Phillips, Katz, Clark & Mortimer

(57) ABSTRACT

A dispensing closure (40) for use with a container (44) includes a body (54) having a dispensing spout (72) with an interior surface (80) that defines at least a portion of a passage (132) for communicating with the container interior to permit the flow of a fluent substance through the body (54). The dispensing closure (40) includes a closing element (56) attached to the body (54). The closing element (56) defines a transverse cover (130) having a closed position relative to the body (54) and an actuated, open position relative to the body (54). The transverse cover (130) has an outwardly projecting toggle tab (58) for being engaged by a user to move the transverse cover (130) from the closed position to the actuated, open position. The transverse cover (130) further has a flexible, resilient cantilevered sealing portion (142) that seals against the interior surface (80) of the dispensing spout (72) with the transverse cover (130) located in the closed position.

8 Claims, 22 Drawing Sheets

(51) Int. Cl.
  *B65D 47/08* (2006.01)
  *F16K 21/04* (2006.01)

(52) U.S. Cl.
  CPC .......... *F16K 21/04* (2013.01); *B65D 47/0804* (2013.01); *B65D 47/2025* (2013.01); *B65D 2543/00296* (2013.01)

(58) Field of Classification Search
  CPC ........ B65D 2543/00296; B65D 47/043; F16K 21/04
  USPC ........................................ 251/342
  See application file for complete search history.

(56) References Cited

U.S. PATENT DOCUMENTS

| | | | |
|---|---|---|---|
| 4,211,348 A | | 7/1980 | Scholle |
| 4,444,340 A | * | 4/1984 | Bond ................ B65D 47/2025 |
| | | | 222/498 |
| 4,645,100 A | | 2/1987 | Wells |
| 4,787,538 A | | 11/1988 | Fattori |
| 5,000,359 A | | 3/1991 | Scholle et al. |
| 7,293,676 B2 | * | 11/2007 | Liston ................ B65D 77/067 |
| | | | 222/563 |
| 2003/0029890 A1 | * | 2/2003 | Olechowski .......... B65D 47/24 |
| | | | 222/525 |
| 2005/0236442 A1 | | 10/2005 | Kratzer |

\* cited by examiner

DISPENSING CLOSURE FOR A CONTAINER

TECHNICAL FIELD

The present invention relates generally to a dispensing closure for a container of a fluent substance.

BACKGROUND OF THE INVENTION AND TECHNICAL PROBLEMS POSED BY THE PRIOR ART

Closures are employed to selectively prevent or permit communication between the exterior and interior of a container (e.g., bottle, flexible pouch, machine, vessel, etc.) through an opening in the container. A typical closure includes at least (1) a receiving structure (e.g., a body, base, fitment, etc.) arranged at the opening to the container interior, and (2) a closing element (e.g., a lid, cover, cap, etc.) that is cooperatively received by the receiving structure.

The receiving structure of the closure can typically be either (1) a separate structure that can be attached at the container opening, and that defines a passage through the structure for communicating with the container opening and the container interior, or (2) an integral structure that is a unitary portion of the container, and which defines a passage through the structure such that the passage functions as the opening to the container. Also, the closing element may be formed together with the receiving structure as a unitary article, or the receiving structure and closing element may be separately made and then assembled together.

The closing element typically is movable relative to the receiving structure passage between (1) a closed position for completely, or at least partially, occluding the passage, and (2) an open position for completely, or at least partially, exposing the passage. Some closures may include additional elements (e.g., freshness seals, dispensing valves, tamper-evident features, child safety features, locking elements, etc.).

A closure may be provided on a rigid, flexible, or collapsible container of one or more fluent substances (e.g., liquids, gels, granules, powders, oils, lotions, creams, cleaning solutions, etc.). A container may be inverted by a user to dispense, or assist in dispensing, the substance from the container through the opened closure. Alternatively, the closure might be located at the bottom end of a container and might function as a gravity-fed spigot or tap for dispensing the fluent substance without the need for the user to invert the container. The container with the closure mounted thereon, and the fluent substance or substances stored therein, may be collectively characterized as a "package" that may be encountered by a consumer.

One type of dispensing closure is a toggle action type, which typically is provided with two primary structures: (1) a rigid closure body that is mounted or sealed to a container opening; and (2) a flexible, resilient closing element having a projecting toggle tab or simply "toggle" for being engaged by a user to move the closing element from a closed or sealed position to an open or actuated position whereby a sealing portion of the closing element is moved away from the closure body to expose a passage for the dispensing of a fluent substance. A user of such a dispensing closure will typically encounter the closing element in the closed position. When the user ceases to exert a force on the toggle, then the resiliency of the closing element returns the sealing portion to seal against the closure body in the closed position.

Examples of prior art toggle action type dispensing closures (which may be referred to by any number of terms such as "spigot" or "tap") are described and illustrated in U.S. Pat. Nos. 3,400,866; 3,443,728; 3,972,452; 4,211,348; 4,248,362; 4,444,340; 4,645,100; and 5,000,359, and in international publication WO 2006/086835—all of which are incorporated by reference herein in their entireties. The prior art also includes dispensing closures that are a push button type that have a deformable membrane which is pressed by a user to move a plunger out of sealing engagement with a fixed body. One such push button type dispensing closure is designated as a model 800235 detergent tap, and is manufactured and sold by Worldwide Dispensers (a subsidiary of DS Smith), having an office in Lester Prairie, Minnesota, USA.

The inventors of the present invention have determined that such prior art dispensing closures may not be suitable for cleanly dispensing certain fluent substances, such as laundry detergent. For example, such prior art dispensing closures may be prone to the accumulation of residual fluent substance on the closure after the dispensing process, which may lead to the formation of undesirable drips. Furthermore, such prior art closures may not dispense a fluent substance in a controlled manner.

The inventors have considered that it would be beneficial to provide an improved dispensing closure that is more easily actuated or operable by one hand of a user, and yet is resistant to accidental opening.

The inventors have further determined that it would be desirable to provide an improved dispensing closure that has a reduced height when installed on a container and/or a reduced number and/or complexity of components.

The inventors of the present invention have also determined that it would be desirable to provide an improved dispensing closure that can be configured for use with a container of a fluent substance so as to have one or more of the following advantages: (i) an improved ease of manufacture and/or assembly, (ii) a reduced cost of manufacture and/or assembly, and (iii) the capability to accommodate optional tamper-resistant features or other features.

The inventors of the present invention have invented a novel structure for a dispensing closure for use with a container wherein the dispensing closure addresses one or more of the above-described problems, and includes various advantageous features not heretofore taught or contemplated by the prior art.

BRIEF SUMMARY OF THE INVENTION

According to one form of the present invention, a dispensing closure is provided for use with a container having an opening between an exterior of the container and an interior of the container where a fluent substance may be stored. The dispensing closure includes a body for being located at the opening of the container and having a dispensing spout defining an interior surface. The interior surface defines at least a portion of a passage for communicating with the container interior to permit the flow of a fluent substance through the body.

The dispensing closure further includes a closing element attached to the body. The closing element defines an outer wall mounted around at least a portion of the dispensing spout of the body.

The closing element further defines a transverse cover that extends laterally inwardly from the outer wall and that has a closed position relative to the body and an actuated, open position relative to the body. The transverse cover has an outwardly projecting toggle tab for being engaged by a user to move the transverse cover from the closed position to the actuated, open position. The transverse cover further has a flexible, resilient cantilevered sealing portion spaced laterally from the outer wall to define an aperture for receiving the dispensing spout of the body. The resilient cantilevered sealing portion seals against the interior surface of the dispensing spout with the transverse cover located in the closed position. When the toggle tab is engaged by a user to move the transverse cover to the actuated, open position, then the cantilevered sealing portion is moved away from the interior surface to expose the passage.

In one form of the invention, the transverse cover of the dispensing closure has at least one wiping bead that is arranged to wipe against the interior surface of the dispensing spout when the transverse cover moves from the actuated, open position to the closed position.

In one form of the invention, the transverse cover of the dispensing closure has at least one sealing bead with a normally closed configuration sealing against the interior surface of the dispensing spout when the transverse cover is located in the closed position. The transverse cover of the dispensing closure further has at least one wiping bead that is spaced axially-outwardly from the at least one sealing bead when the transverse cover is located in the closed position. The at least one wiping bead is arranged to wipe against the interior surface of the dispensing spout when the transverse cover moves from the actuated, open position to the closed position.

In another form of the invention, the body of the dispensing closure includes a baffle with at least one aperture therein for restricting flow of a fluent substance through the body.

In yet another form of the invention, the dispensing spout of the body is provided with a pour lip that directs the flow of a fluent substance out of the dispensing closure. The pour lip extends outwardly from the interior surface and projects laterally relative to the interior surface to define at least part of a pour path.

In still another form of the invention, the dispensing spout of the body is substantially cylindrical, and the pour lip extends between about twenty degrees and about thirty degrees around a circumference of the dispensing spout.

In one form of the invention, the cantilevered sealing portion of the transverse cover has a cup-like, substantially concave configuration against the interior surface of the dispensing spout when the transverse cover is in its closed position. The concavity of the cantilevered sealing portion is apparent when viewed from a location that is axially outward of the transverse cover, looking axially inward toward the transverse cover.

In one form of the invention, the cantilevered sealing portion of the transverse cover has a convex configuration when the transverse cover is located in the actuated, open position. The convex configuration of the cantilevered sealing portion is apparent when viewed from a location that is axially outward of the transverse cover, looking axially inward toward the transverse cover.

In another form of the invention, the cantilevered sealing portion of the transverse cover has a substantially concave configuration against the interior surface of the dispensing spout when the transverse cover is located in the closed position. The concavity of the cantilevered sealing portion is apparent when viewed from a location that is axially outward of the transverse cover, looking axially inward toward the transverse cover. The cantilevered sealing portion of the transverse cover further has a convex configuration when the transverse cover is located in the actuated, open position. The convex configuration of the cantilevered sealing portion is apparent when viewed from a location that is axially outward of the transverse cover, looking axially inward toward the transverse cover.

In still another form of the invention, the aperture in the closing element for receiving the dispensing spout of the body is arcuate, when viewed from a location that is axially outward of the closing element looking axially inward toward the aperture.

In yet another form of the invention, the dispensing spout of the body includes a pour lip for directing flow of a fluent substance out of the dispensing closure. The at least one wiping bead is variably spaced from the at least one sealing bead, and the at least one wiping bead is minimally spaced from the at least one sealing bead at a location proximal to the pour lip.

In one form of the invention, the body defines a central axis and the at least one sealing bead generally extends along a plane that is normal to the axis when the transverse cover is located in the closed position. The at least one wiping bead extends along a generally arcuate path that is outwardly of the plane when the transverse cover is located in the closed position.

According to another form of the invention, the dispensing spout of the body includes a pour lip for directing flow of a fluent substance out of the dispensing closure. The cantilevered sealing portion is located axially inward of the pour lip when the transverse cover is located in the closed position.

According to still another form of the invention, the dispensing spout of the body includes a pour lip for directing flow of a fluent substance out of the dispensing closure. The at least one wiping bead contacts the interior surface of the dispensing spout at a location that is axially inward of the pour lip when the transverse cover moves from the actuated, open position to the closed position.

In another aspect of the invention, the interior surface of the dispensing spout slopes linearly downwardly and inwardly and the pour lip has an arcuate pour surface that merges with the interior surface.

In another aspect of the invention, the at least one sealing bead and the at least one wiping bead are generally convex in shape and are separated by a recessed surface.

Instill another aspect of the invention, the outer wall of the closing element includes a recessed surface that is located adjacent to, and radially outward of, the dispensing spout.

In still another aspect of the invention, the outer wall of the closing element includes an outer end in the form of a laterally-extending flange for being engaged by a user to move the transverse cover from the closed position to the actuated, open position.

In yet another aspect of the invention, the dispensing closure is in combination with a container of a fluent substance having a viscosity between about 40 millipascal-second and about 600 millipascal-second. The dispensing closure, the container, and the fluent substance together define a package.

In another aspect of the invention, the body of the dispensing closure is formed from a plastic material and the closing element is formed from an elastomeric material that is relatively more resilient and flexible than the plastic material.

In one aspect of the invention, the body of the dispensing closure defines a central axis. The spout is symmetrical about a first plane that contains the axis and that bisects the spout. When the transverse cover is located in the actuated, open position, then at least part of the cantilevered sealing portion opens at an angle between about ten degrees and about twenty degrees relative to a second plane that is normal to the axis, as measured in the first plane.

In one aspect of the invention, the body of the dispensing closure is one of: (i) a separate structure for being attached to a container at an opening in the container; and (ii) an integral structure that is a unitary part of a container and that is formed at an opening in the container.

According to another form of the present invention, a dispensing closure is provided for use with a container having an opening between an exterior of the container and an interior of the container where a fluent substance may be stored. The dispensing closure includes a body for being located at the opening of the container and having a dispensing spout defining an interior surface. The interior surface defines at least a portion of a passage for communicating with the container interior to permit the flow of a fluent substance through the body.

The dispensing closure further includes a closing element attached to the body. The closing element defines an outer wall mounted around at least a portion of the dispensing spout of the body.

The closing element further defines a transverse cover that extends laterally inwardly from the outer wall and that has a closed position relative to the body and an actuated, open position relative to the body. The transverse cover has an outwardly projecting toggle tab for being engaged by a user to move the transverse cover from the closed position to the actuated, open position.

The transverse cover further has at least one sealing bead with a normally closed configuration sealing against the interior surface of the dispensing spout when the transverse cover is located in the closed position. The transverse cover further has at least one wiping bead that is spaced axially-outwardly from the at least one sealing bead when the transverse cover is located in the closed position. The at least one wiping bead is configured to wipe against the interior surface of the dispensing spout when the transverse cover moves from the actuated, open position toward the closed position.

It should be appreciated that other objects, features, and advantages of the invention will become apparent from a review of the entire specification including the appended claims and drawings.

BRIEF DESCRIPTION OF THE DRAWINGS

In the accompanying drawings forming part of the specification, in which like numerals are employed to designate like parts throughout the same.

FIG. 10 shows the closing element maintained by a user in an open position;

DESCRIPTION OF THE PREFERRED EMBODIMENT

While this invention is susceptible of embodiment in many different forms, this specification and the accompanying drawings disclose a specific form as an example of the invention. The invention is not intended to be limited to the embodiment so described, and the scope of the invention will be pointed out in the appended claims.

For ease of description, many figures illustrating the invention show the embodiment of a dispensing closure in the typical orientation that the dispensing closure would have when installed at the opening of a container in the form of an upright, rigid bottle or an upright, bag-in-box type packaging. Terms such as "inward", "outward", "upper", "lower", "axial", "radial", "lateral", etc., are used with reference to this orientation. It will be understood, however, that the dispensing closure of this invention may be manufactured, stored, transported, used, and sold in an orientation other than the orientation described and illustrated.

The dispensing closure of this invention is especially suitable for use with a variety of conventional or special containers, the details of which, although not fully illustrated or described, would be apparent to those having skill in the art and an understanding of such containers. The particular container illustrated is not intended to limit the present invention. It will also be understood by those of ordinary skill that novel and non-obvious inventive aspects are embodied in the described dispensing closure alone.

The dispensing closure described herein is especially suitable for use on a container that contains a liquid or fluent substance that can be dispensed, or otherwise removed, from the container through the opened closure. Such substances may be, for example, a cleaning product, a food product, a pharmaceutical product, or other types of products. Such substances may be for external use or internal use by humans or animals, or for other uses.

One exemplary dispensing closure of the present invention (and components thereof) is illustrated in FIGS. 1-23, wherein the dispensing closure is designated generally by the reference number 40. The illustrated embodiment of the dispensing closure 40 has the form of an article that is configured to be attached or assembled to a separately manufactured container 44, which has the form of a substantially rigid bottle that would typically contain a somewhat viscous fluent substance such as a liquid laundry detergent.

Figure 1:
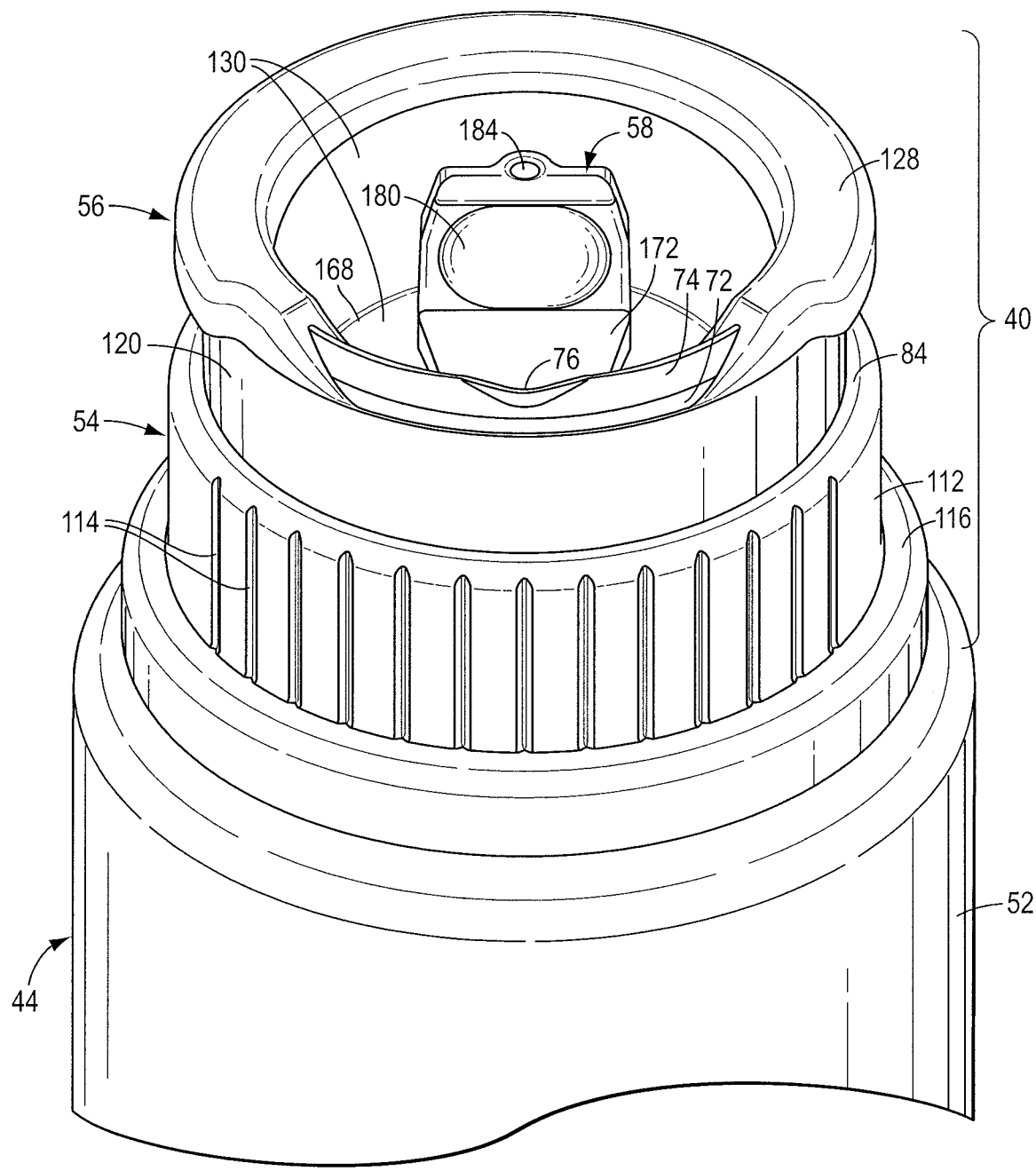
FIG. 1 is an isometric view, taken from below, of a dispensing closure of the present invention, with the closing element of the dispensing closure shown in a closed position, and with the dispensing closure installed at the opening of a container wherein only a fragmentary, upper portion of the container is illustrated in FIG. 1.
Figure 2:
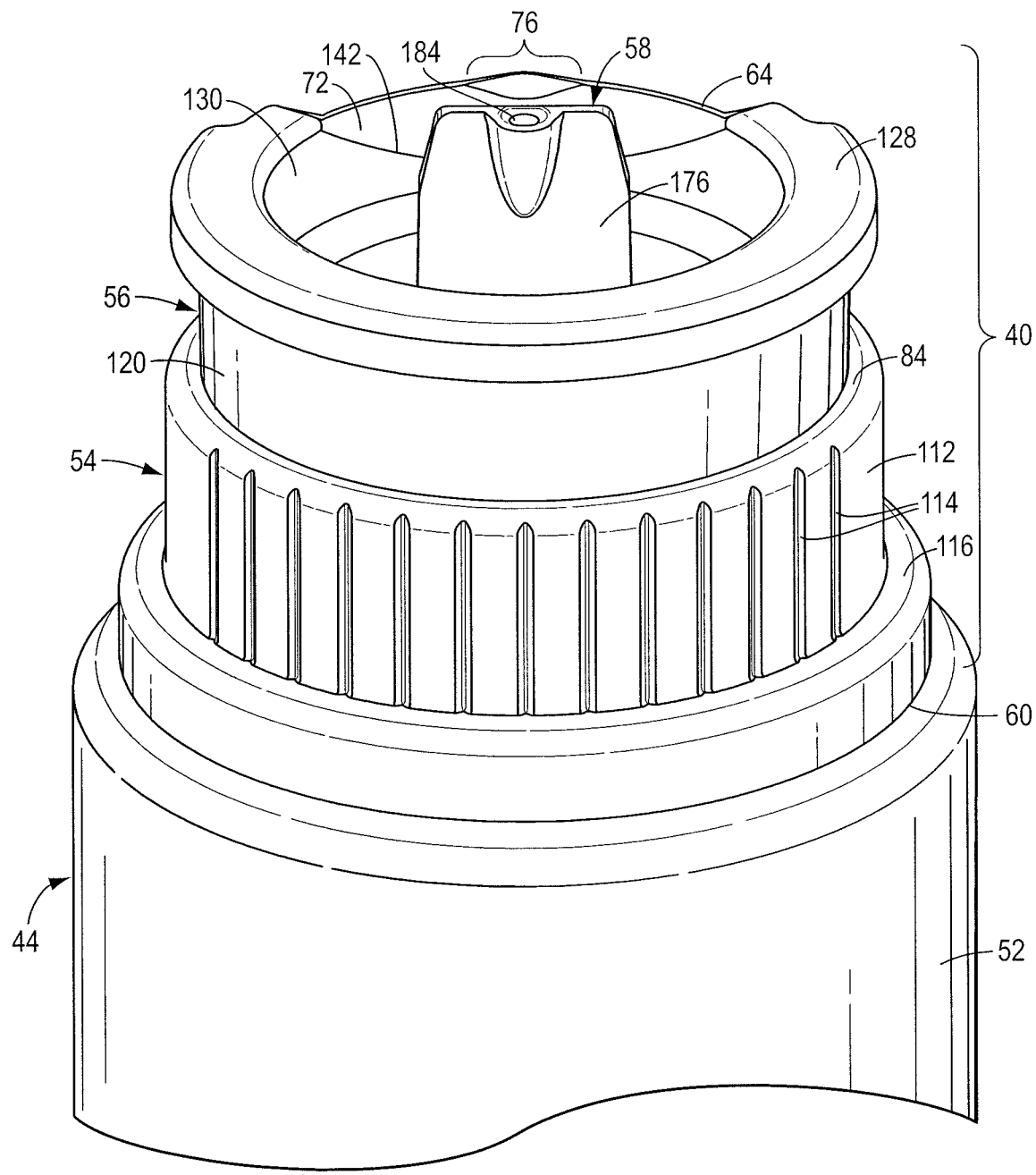
FIG. 2 is an isometric view, taken from above, of the dispensing closure and container illustrated in FIG. 1.
Figure 7:
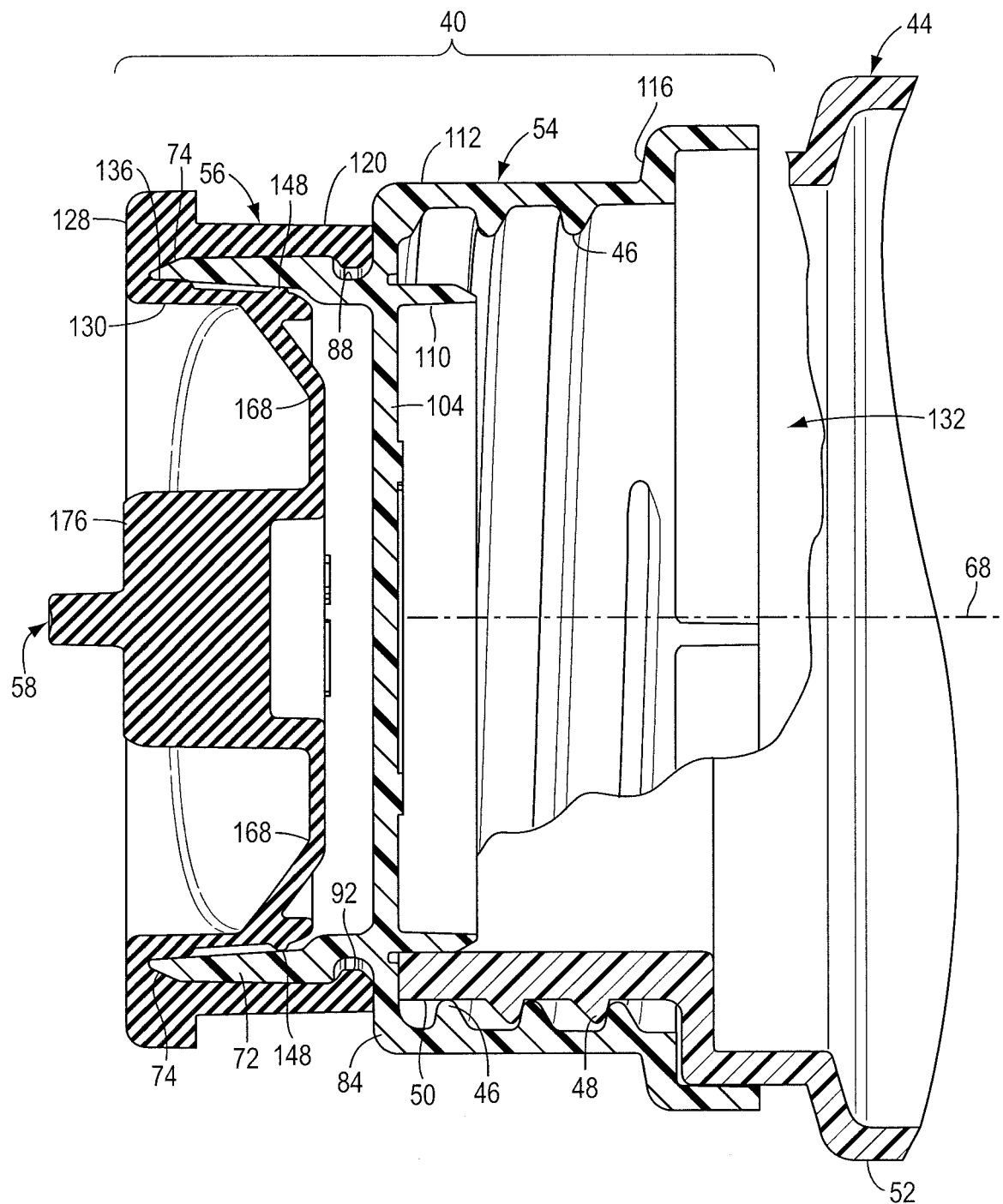
FIG. 7 is a fragmentary, enlarged, cross-sectional view of the dispensing closure and the container illustrated in FIG. 1, taken generally along the plane 7-7 in FIG. 6.

It will be understood that the container 44 may be any other suitable type, such as a collapsible, flexible pouch or bag that is either contained within a box or carton or is free of any box or carton. Alternatively, the container 44 could be a generally rigid bottle that has somewhat flexible, resilient walls. FIGS. 1, 2, and 7 show the first embodiment of the dispensing closure 40 attached to a container 44 that is a generally rigid bottle wherein the product within the container 44 may be removed when the dispensing closure 40 is maintained in an actuated, open position by the user, whereby gravity draws the fluent substance from the container 44 and through the opened dispensing closure 40. The closure 40 may instead be used on a larger dispensing system (not illustrated) that may include, or be part of, for example, a medical device, processing machine, reservoir on a machine, etc., wherein the system has an opening to the system interior.

The container 44, or a portion thereof, may be made from a material suitable for the intended application. For example, the container 44 may be a bottle molded from polyethylene, polypropylene, polyethylene terephthalate, polyvinylchloride, glass, or other materials. Alternatively, the container 44 could be a pouch made from a thin, flexible material wherein, such a material could be a polyethylene terephthalate (PET) film or a polyethylene film and/or an aluminum foil.

In applications wherein the dispensing closure 40 is mounted to a container 44 such as a bottle, it is contemplated that typically, after the closure manufacturer would make the dispensing closure 40 (e.g., by molding the closure components from a thermoplastic polymer and elastomer), the closure manufacturer will then assemble the components and ship the dispensing closure 40 to a container filler facility at another location where the container 44 is either manufactured or otherwise provided, and where the container 44 is filled with a product prior to installation of the dispensing closure 40.

If the container 44 is a collapsible pouch (not illustrated), then the dispensing closure 40 may include a suitable fitment portion that can be attached to the pouch as the pouch is being made and filled, or as the pouch is being made but before the pouch is subsequently filled through the open dispensing closure 40 or through open regions of the pouch walls that are later sealed closed.

In the illustrated embodiment of the dispensing closure 40 in FIGS. 1-23, the dispensing closure 40 is provided as a separately manufactured article, component, or unit with internal screw threads 46 (FIG. 7) for mating with external screw threads 48 (FIG. 7) on the container 44, which will be discussed in detail hereinafter. It will be appreciated, however, that in some applications, it may be desirable for the dispensing closure 40 to be snap fit onto a container or attached to a container in a manner that would not allow a user to easily remove the dispensing closure 40, such as being glued, press-fit, welded, locked, etc. Further, it may be desirable for the dispensing closure 40 (or some part thereof) to be formed as a unitary part, or extension, of the container 44 wherein such a unitary part or extension also (i.e., simultaneously) defines an end structure of the container 44, per se.

The container 44, per se, does not form a part of the broadest aspects of the present invention. The container 44 may have any suitable configuration.

With reference to FIG. 7, the container 44 includes an outer end portion 50 that defines the container mouth or opening and the external thread 48 (or snap-fit bead, not illustrated) for mating with the cooperating internal thread 46 (or snap-fit bead, not illustrated) of the dispensing closure 40. The container outer end portion 50 has a cross-sectional configuration with which the dispensing closure 40 is adapted to engage. Extending inwardly from the container outer end portion 50 is a main body portion 52 of the container 44. The main body portion 52 of the container 44 has a cross-sectional configuration that differs from the cross-sectional configuration of the container outer end portion 50 at the container opening. In other types of containers, the container may instead have a substantially uniform shape along its entire length or height without any portion of reduced size or different cross-section.

Figure 3:
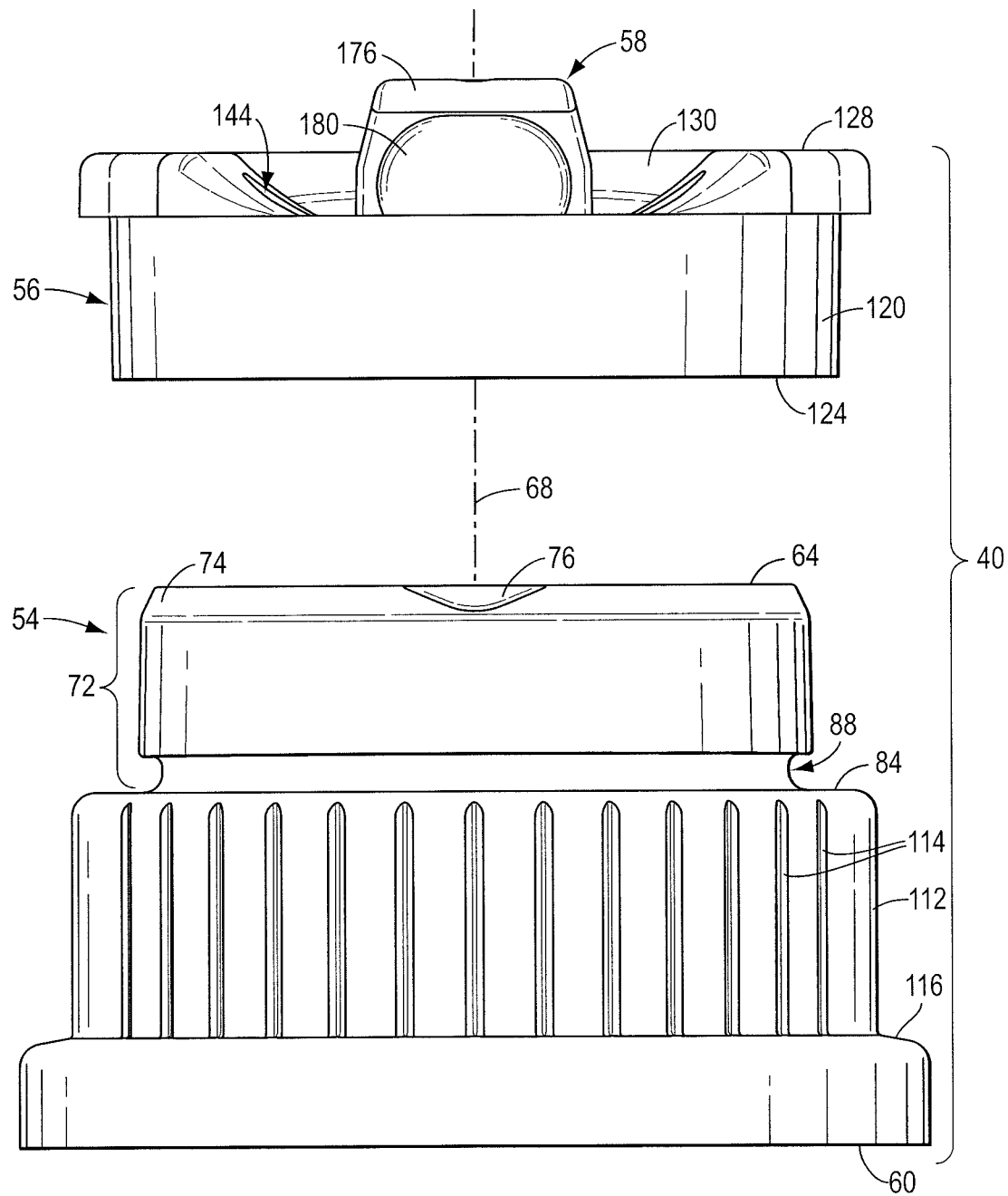
FIG. 3 is an exploded, bottom view of only the dispensing closure illustrated in FIG. 1.
Figure 4:
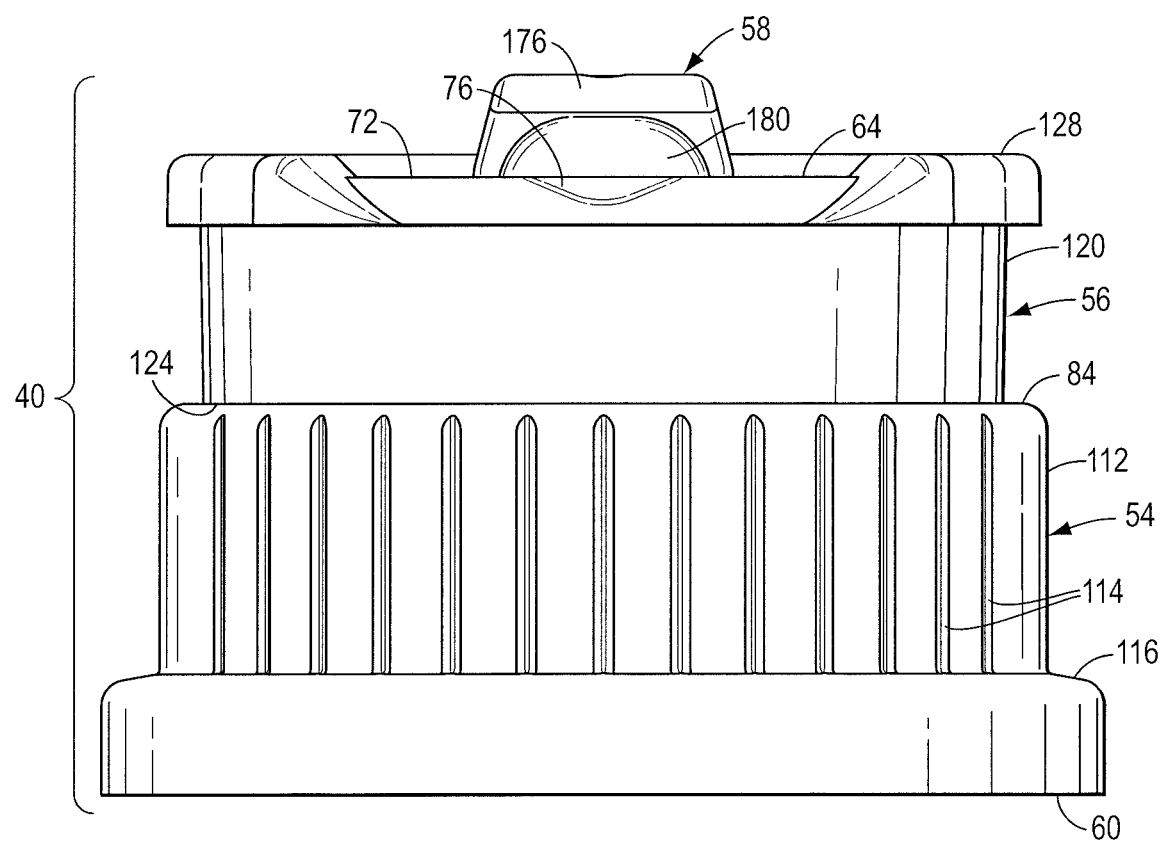
FIG. 4 is a bottom view of only the dispensing closure illustrated in FIG. 1.
Figure 5:
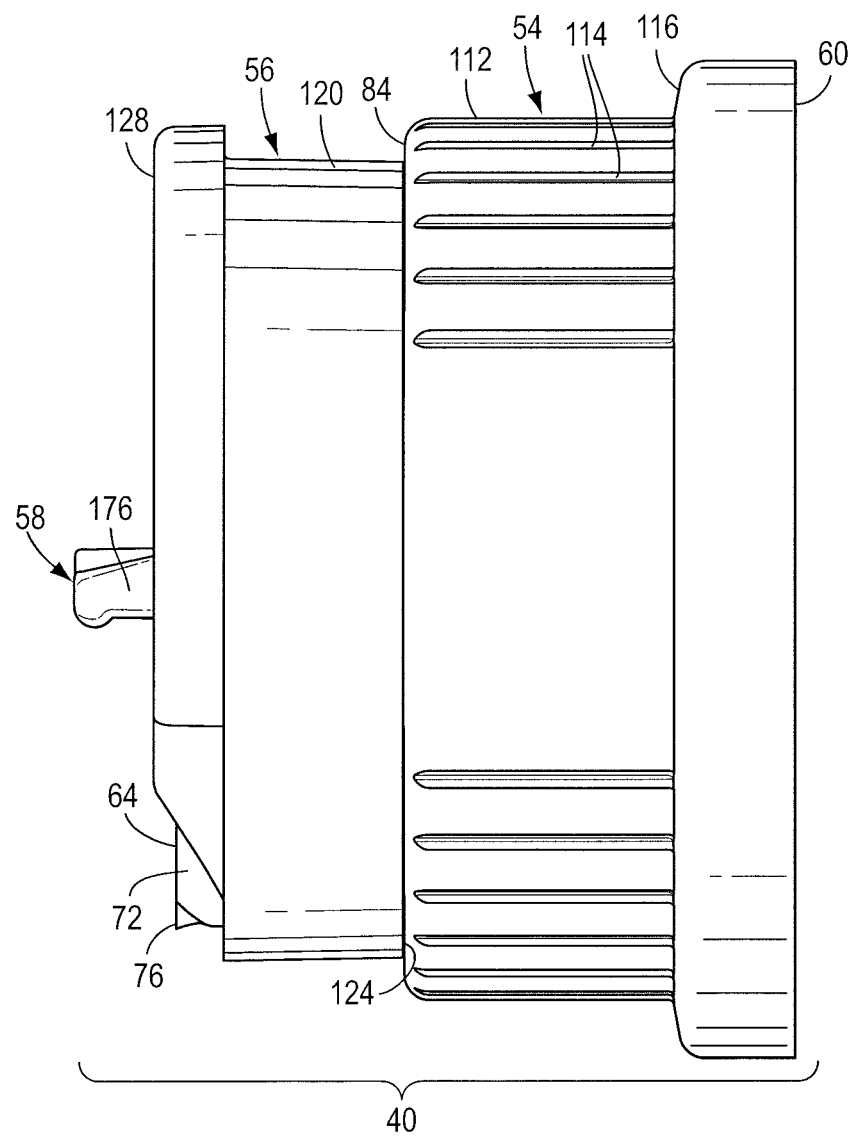
FIG. 5 is a right side elevation view of only the dispensing closure illustrated in FIG. 1.
Figure 8:
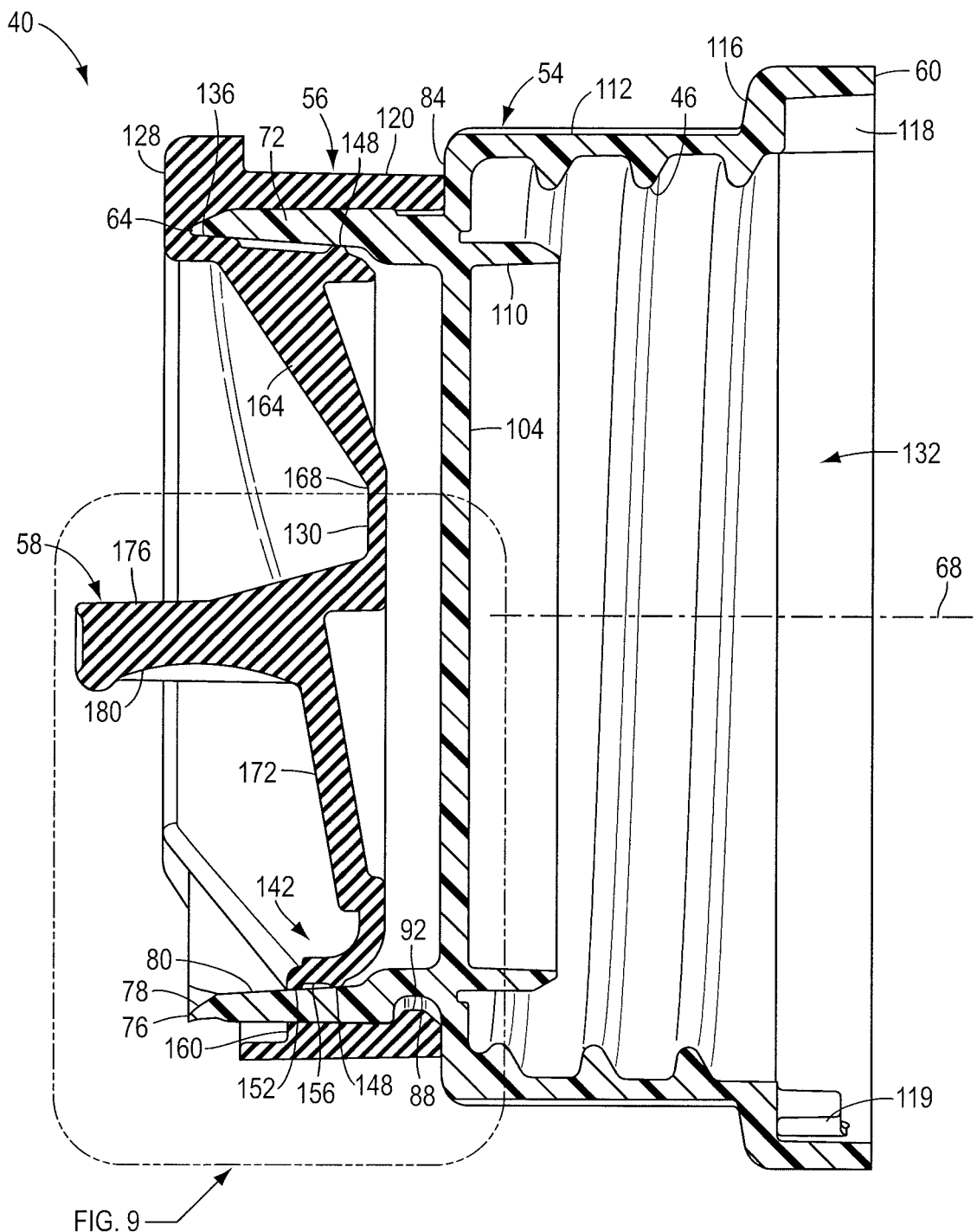
FIG. 8 is an enlarged, cross-sectional view of only the dispensing closure illustrated in FIG. 1, taken generally along the plane 8-8 in FIG. 6, but in FIG. 8 the container has been omitted.
Figure 10:
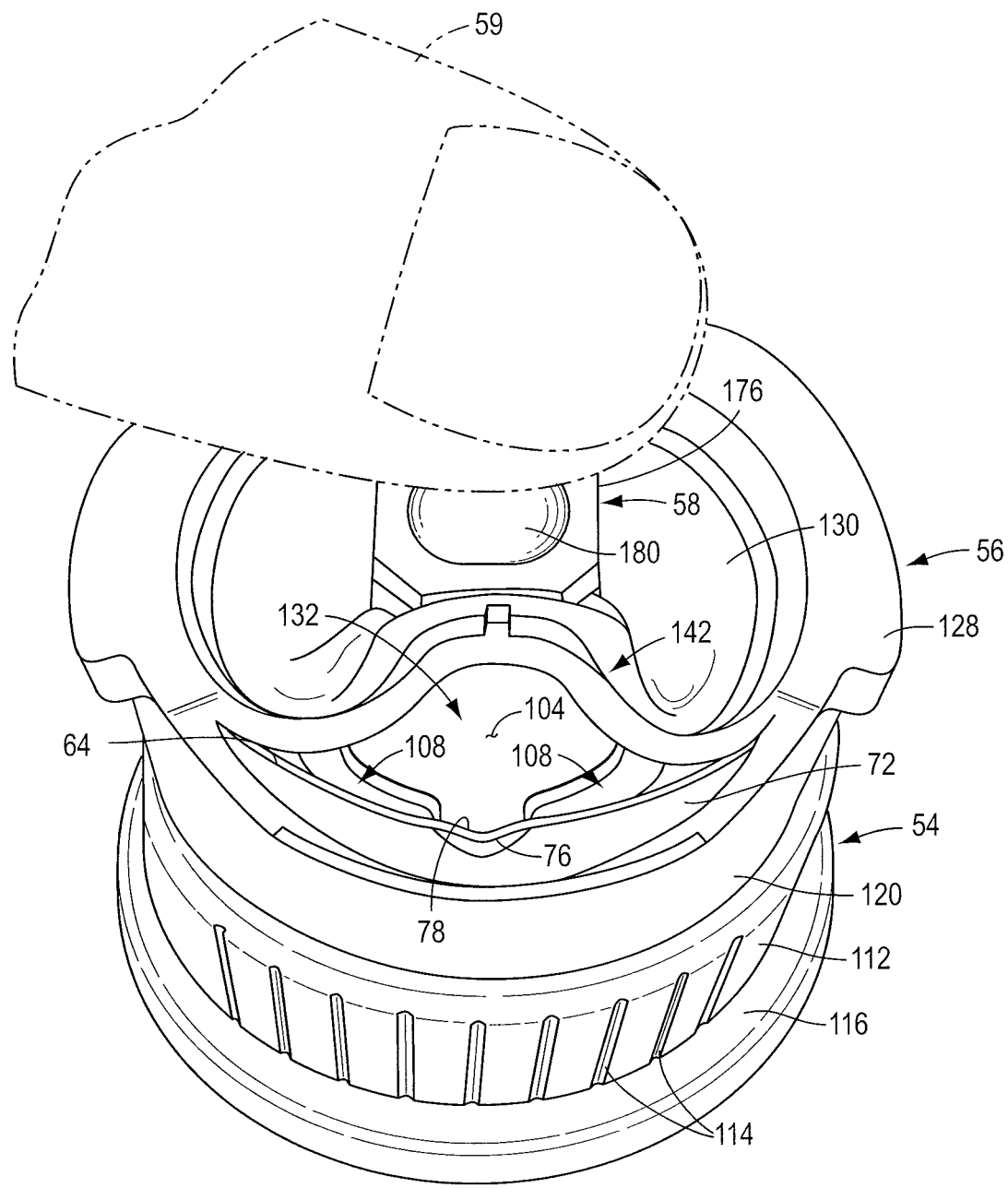
FIG. 10 is a perspective view, taken from below, of only the dispensing closure of FIG. 1.
Figure 11:
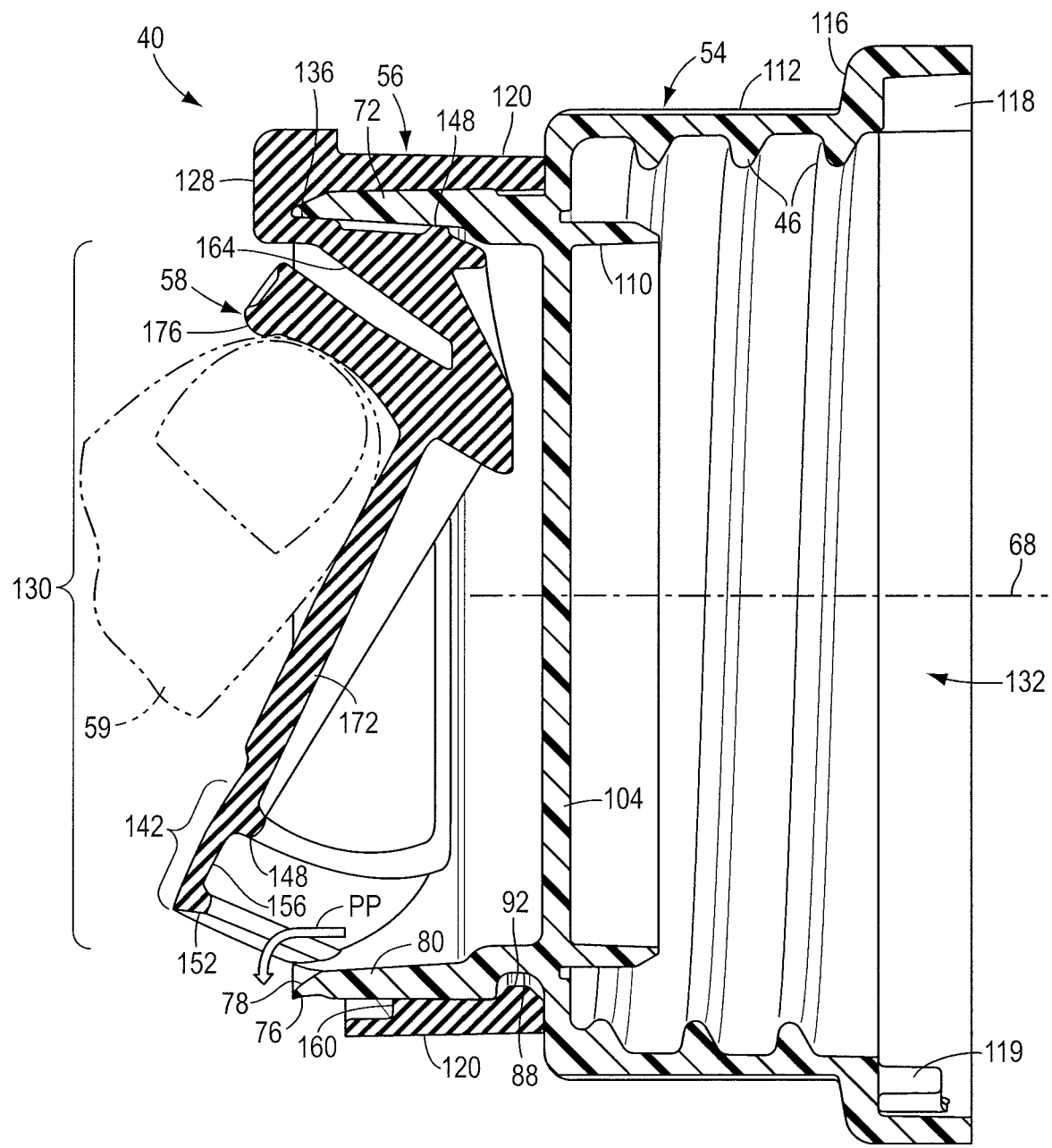
FIG. 11 is an enlarged, cross-sectional view of only the dispensing closure illustrated in FIG. 1, taken generally along the plane 8-8 in FIG. 6, but FIG. 11 shows the closing element moved into in an open position.

With reference now to FIGS. 3, 7, and 8, the dispensing closure 40 includes the following basic components of: (i) a generally rigid, hollow body 54 for being located, sealed, or otherwise affixed at an opening in the container 44 (visible in FIG. 7); and (ii) a closing element 56 that is mounted around the body 54, at least a portion of the closing element 56 is flexible and resilient for normally sealing the dispensing closure 40 closed to prevent the flow of a fluent substance through the interior of the body 54. As discussed in greater detail below, the closing element 56 has a normally closed, non-dispensing position (which may be more simply referred to hereinafter as a "closed position") for occluding the hollow interior of the body 54 to prevent flow of a fluent substance therethrough. The closing element 56 is provided with a toggle tab or lever 58 that may be engaged or pressed by a user's finger or thumb 59 (as illustrated in FIGS. 10 and 11) to cause the flexible and resilient portion of the closing element 56 to pivot or pull away from the body 54 into an actuated, open position (which may be more simply referred to hereinafter as an "open position") that permits a flow of the fluent substance from the interior of the container 44, through an opening between the closing element 56 and the body 54, and out to the exterior of the container 44 or environment.

The body 54 of the dispensing closure 40 is preferably molded as a from a suitable thermoplastic material such as polypropylene or polyethylene. Other materials may be employed instead. The closing element 56 is preferably molded as a from a suitable elastomeric material such as a polyolefin, which is substantially less rigid than the material used for the body 54. Other elastomeric materials may be employed instead, such as polyvinyls or polyurethanes. In the illustrated embodiment of the closure 40, the body 54 and the closing element 56 are separately molded or otherwise formed and subsequently assembled into the operative configuration illustrated in FIGS. 1, 2, and 4-9. It will be understood that in alternative designs (not illustrated), the body 54 and the closing element 56 may be formed unitarily by bi-injection molding or other processes. Further, it will be understood that the body 54 may be unitarily formed or molded as an extension of the upper end of the container 44 and need not be a separately formed article of manufacture.

Referring now to FIGS. 3, 13, 14, and 15, the body 54 of the dispensing closure 40 has a generally cylindrical shape with a receiving or inlet end 60 for receiving the outer end portion 50 of the container 44 (as illustrated in FIG. 7), and a dispensing or outlet end 64 that is spaced from the inlet end 60 along a central axis 68 (FIG. 3). The outlet end 64 of the body 54 includes a dispensing spout 72 (FIG. 13), which includes an annular exterior surface 74 that is tapered for being received within a portion of the closing element 56. A front, bottom portion of the dispensing spout 72 further defines a pour lip 76. As can be seen in the cross-sectional view of FIG. 9, the pour lip 76 has an interior, sloping, arcuate pour surface 78 that extends laterally and outwardly from a drafted or tapered interior surface 80 of the dispensing spout 72. As viewed in FIG. 9, the pour surface 78 can be characterized as extending outwardly (to the left in FIG. 9) from the surface 80, and can also be characterized as extending laterally (downward in FIG. 9) from the surface 80. The pour surface 78 and the interior surface 80 define or make up a part of a flow path or pour path (PP in FIG. 11) through the dispensing closure 40, which will be discussed in detail hereinafter.

Figure 9:
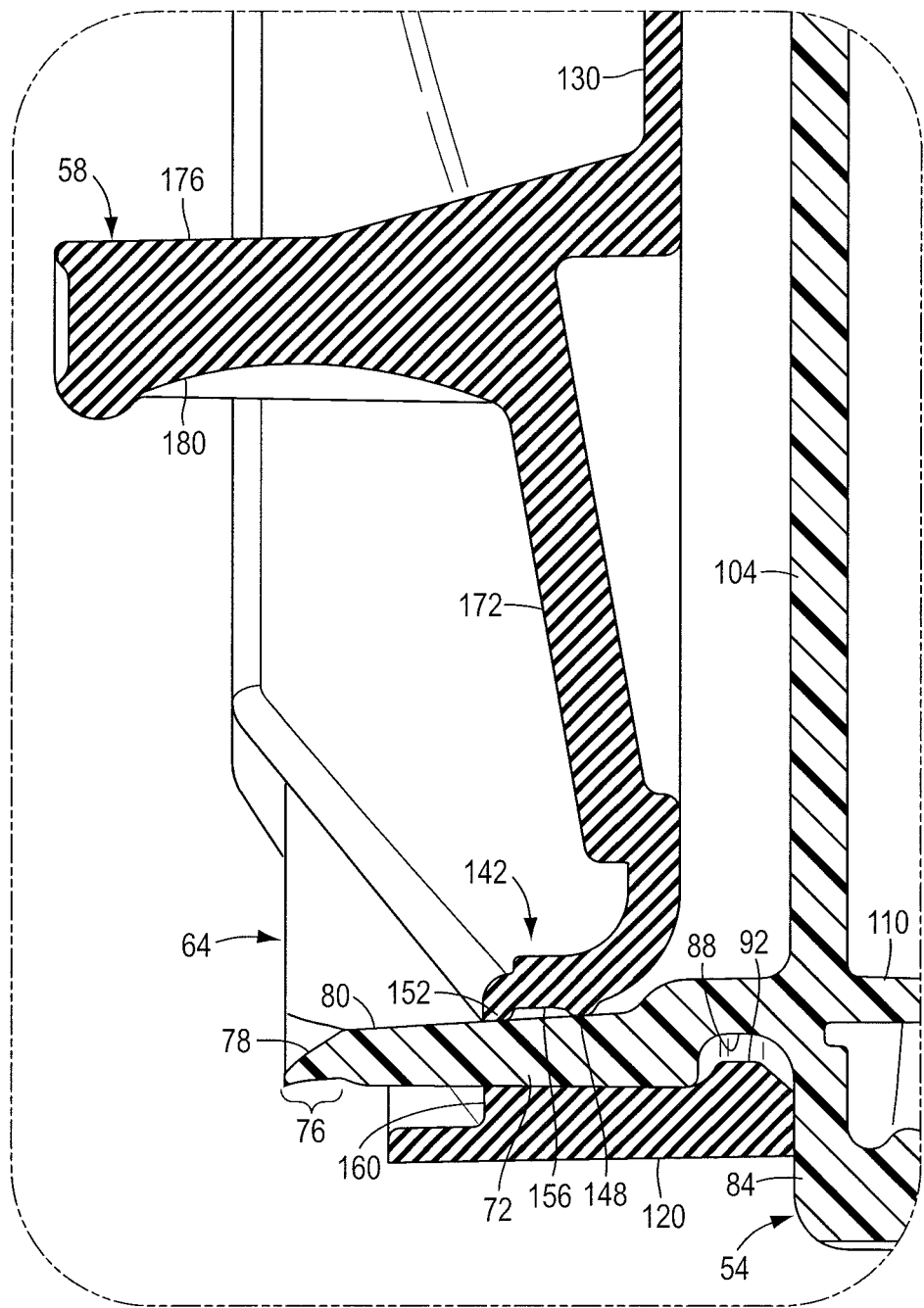
FIG. 9 is a greatly enlarged, fragmentary view of the portion of the dispensing closure enclosed in the rounded rectangle designated as "FIG. 9" in FIG. 8.
Figure 13:
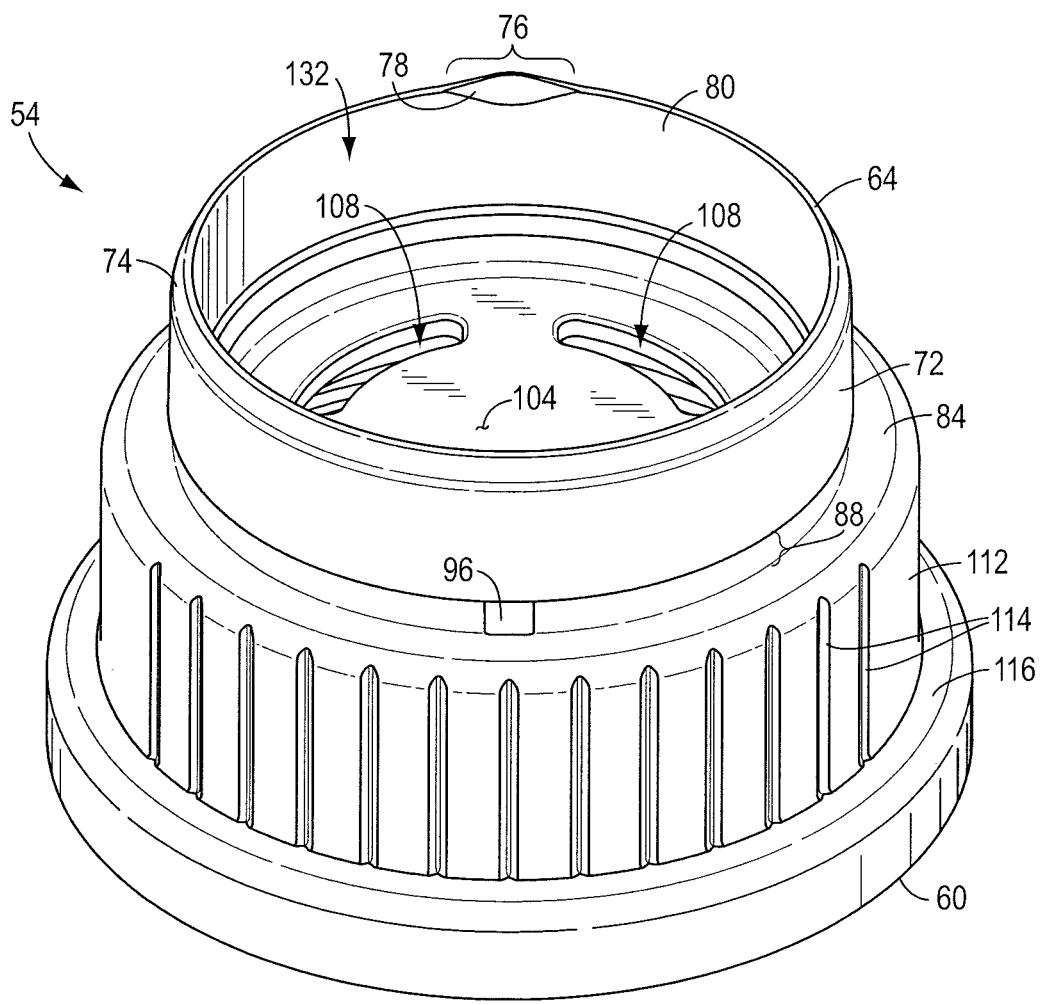
FIG. 13 is an isometric view, taken from above, of only the body of the dispensing closure of FIG. 1.

With reference to FIGS. 3, 9, and 13, moving axially inwardly (i.e., along the axis 68), away from the outlet end 64 toward the inlet end 60 of the body 54, the dispensing spout 72 joins a deck 84, which is generally planar and perpendicular to the closures theoretical longitudinal (i.e., central) axis 68 (illustrated in FIG. 3). The portion of the dispensing spout 72 that connects to the deck 84 includes a recessed surface or recess 88 for receiving an annular bead 92 (visible in FIG. 9) on the closing element 56 to secure the closing element 56 around the dispensing spout 72 (as shown in FIG. 9). The recess 88 includes an abutment or key 96 (visible in FIG. 13) located therein for being received within a notch or gap 100 (FIG. 18) in the closing element annular bead 92. The key 96 and the gap 100 cooperate together to orient the closing element 56 rotationally about the axis 68 relative to the body 54 when the closing element 56 is assembled atop the body 54 with the annular bead 92 retained within the recess 88.

It will be understood that, in alternative configurations of the dispensing closure 40 which are not illustrated, the closing element 56 may be retained atop the body 54 by other means, and need not be limited to the mechanical engagement of a bead 92 within a recess 88 on the body 54. For example, the bead 92 could be located on the body 54, and the recess 88 could be located on the closing element 56. Furthermore, the closing element 56 could be retained atop the body 54 by an adhesive, a friction fit around the dispensing spout 72, or by an additional clamping component or part. Other conventional or special means could be used.

Figure 14:
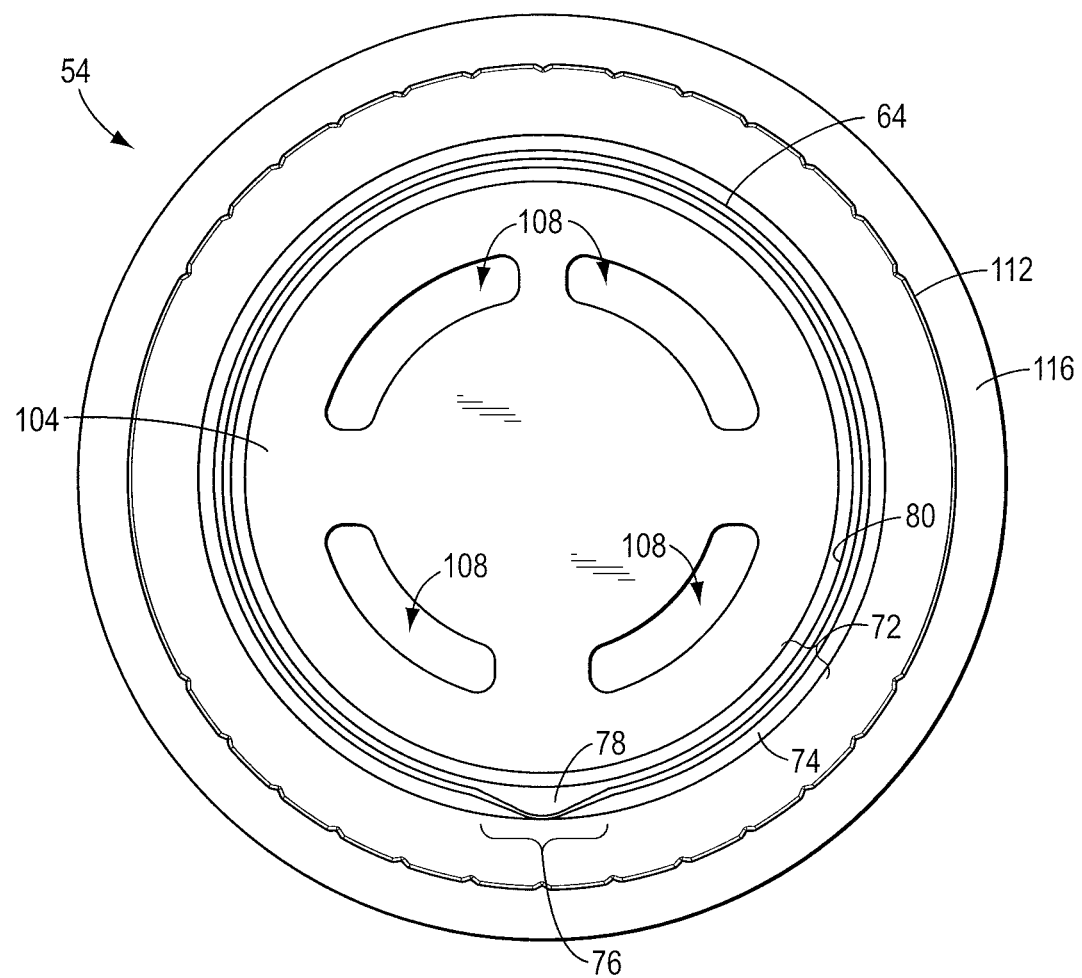
FIG. 14 is a front elevation view of only the body of the dispensing closure of FIG. 1.
Figure 15:
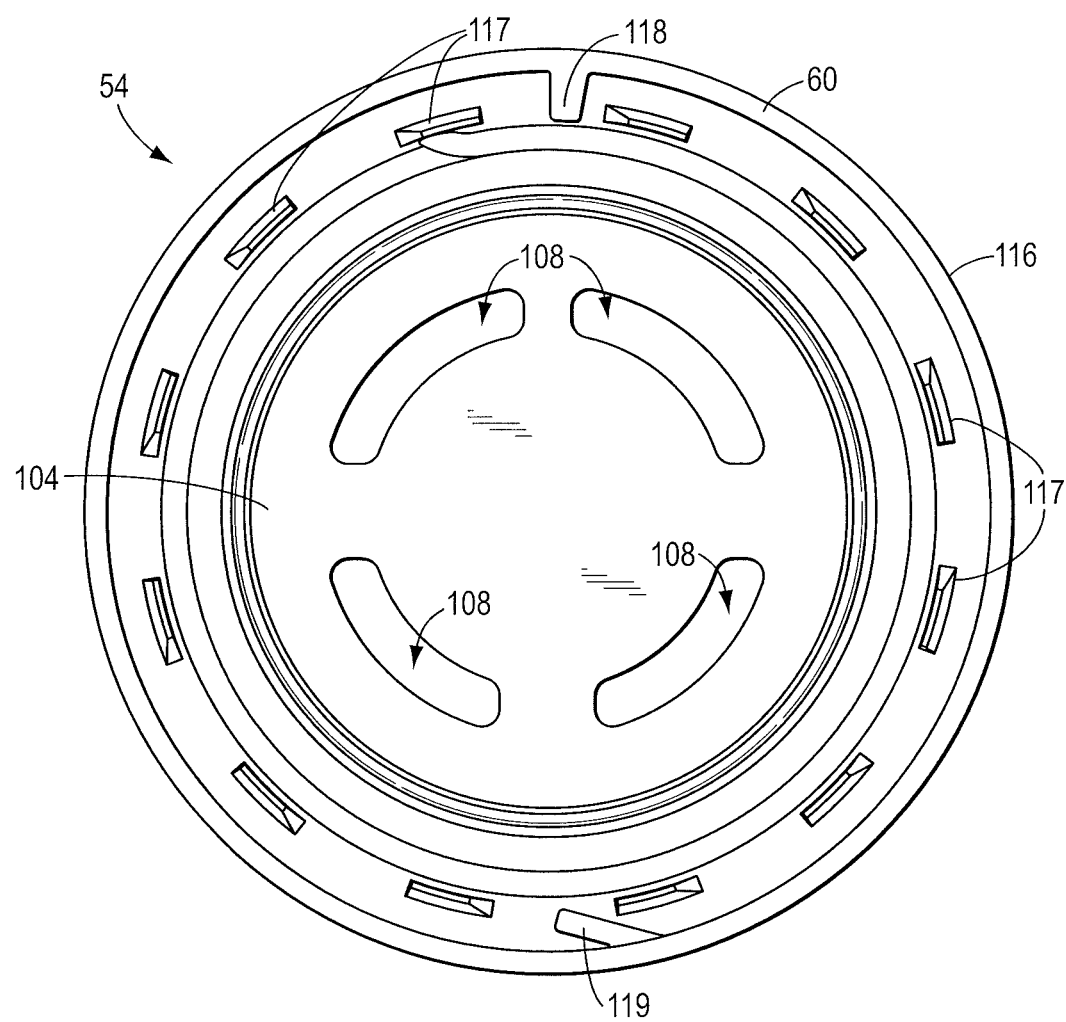
FIG. 15 is a rear elevation view of only the body of the dispensing closure of FIG. 1.

With reference to FIGS. 8, 13, and 14, an interior portion of the deck 84 functions as a baffle 104 to control or impede the flow of a fluent substance through the interior of the body 54 between the inlet end 60 and the outlet end 64. The baffle 104 includes four arcuate apertures 108 (visible in FIG. 14), which restrict the rate of flow through the body 54 to prevent excessive flow or jetting of the fluent substance as it flows out from the interior of the container 44 (FIG. 7). It will be noted that the bridge portion of the baffle 104, that separates the two apertures 108 furthest from the pour lip 76, has a reduced width compared to the other bridges between the apertures 108 for the purpose of assisting in the orientation of the components of the closure 40 during assembly. Referring to FIG. 7, an annular sealing wall or plug seal 110 extends axially inward from the baffle 104 for sealing against the outer portion 50 of the container 44.

As best illustrated in FIGS. 3, 7, 8, and 13, the body 54 includes a depending skirt 112 extending axially inward, below the deck 84. The skirt 112 is cylindrical and has a larger diameter than the dispensing spout 72. The skirt 112 includes the internal threads 46 (visible in FIG. 8) for mating with the external threads 48 (visible in FIG. 7) at the opening of the container 44. The skirt 112 includes a plurality of axially-extending grooves or slots 114 therein (visible in FIG. 3), which function to assist an installer or user to grip the body 54 when threading or unthreading the body 54 relative to the container 44. The skirt 112 terminates at a shoulder 116 at the inlet end 60 of the body 54. A plurality of turning cavities or lugs 117 (FIGS. 8 and 15) extend into an interior surface of the shoulder 116 (FIG. 7), generally in the axially outward direction. After the closure body 54 has been initially molded in a mold, the turning cavities 117 can be used to rotate the closure body 54 in the mold to assist in the extraction of the threaded body 54 from the mold. The shoulder 116 further includes a pair of anti-rotation tabs 118 and 119 (FIGS. 8 and 15) that extend laterally inward from an interior surface of the shoulder 116, such tabs 118 and 119 mating with features (not illustrated) on the container 44 to orient the body 54 of the closure 40 relative to the container 44 about the axis 68 (FIG. 8).

Figure 16:
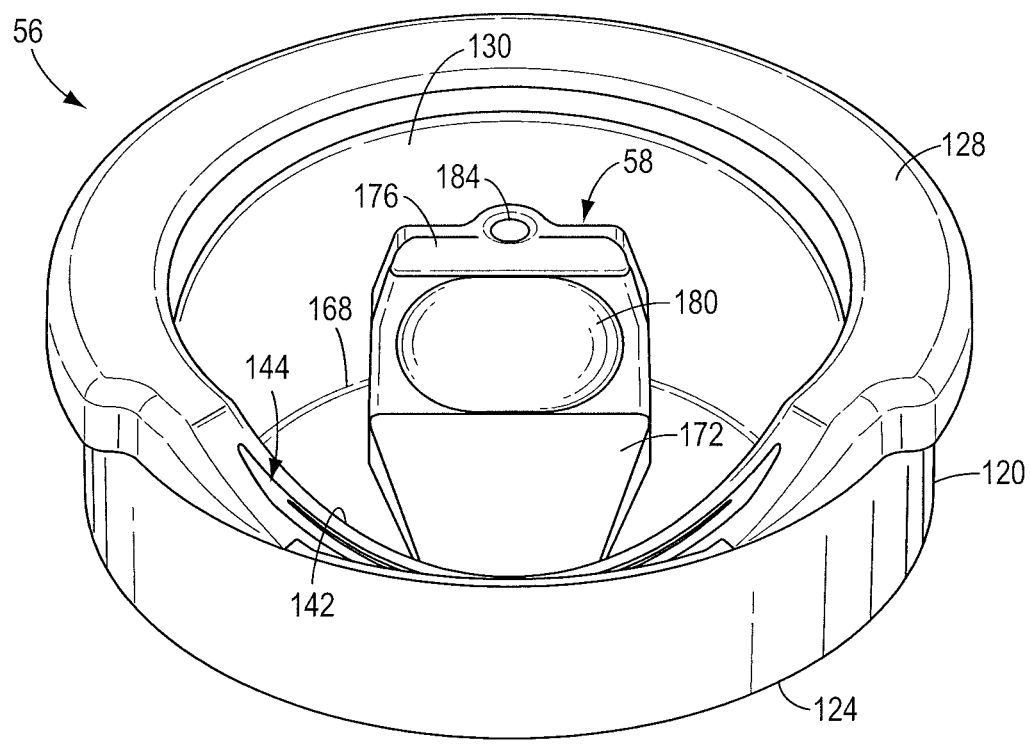
FIG. 16 is an isometric view, taken from in front and below, of only the closing element of the dispensing closure of FIG. 1.
Figure 19:
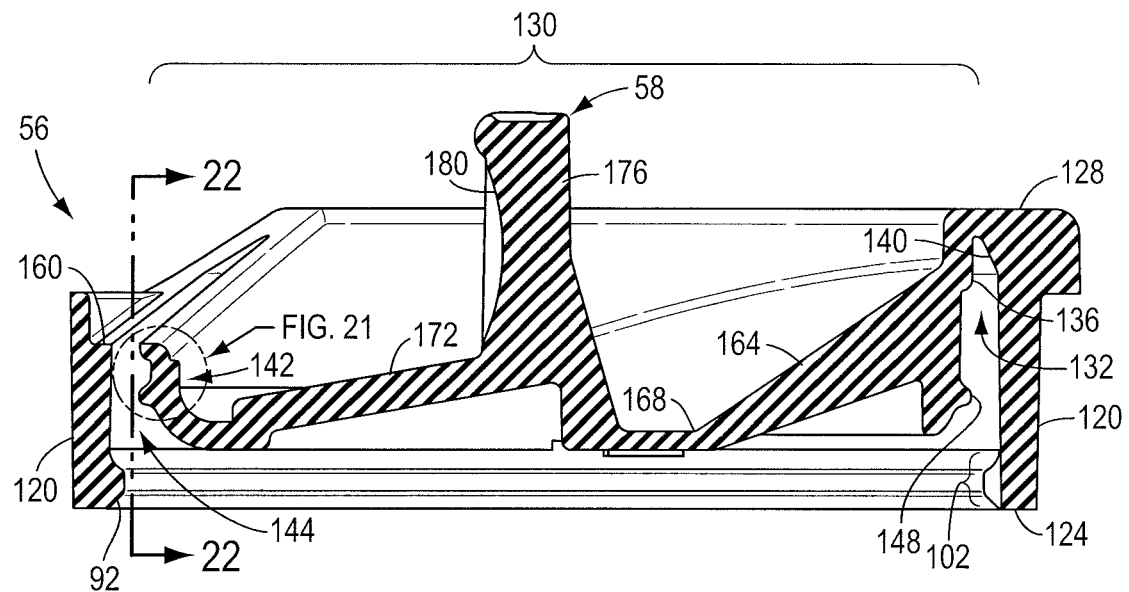
FIG. 19 is a cross-sectional view of only the closing element of the dispensing closure of FIG. 1, taken generally along the plane 19-19 in FIG. 17.
Figure 20:
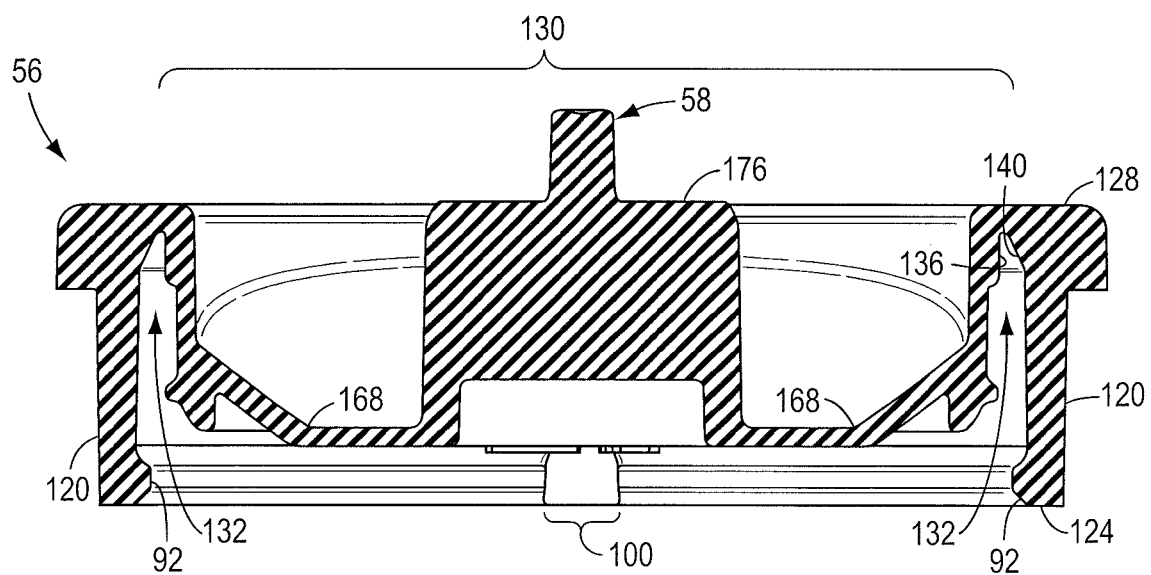
FIG. 20 is a cross-sectional view of only the closing element of the dispensing closure of FIG. 1, taken generally along the plane 20-20 in FIG. 17.

With reference to FIGS. 16, 19, and 20, the closing element 56 includes a generally cylindrical, outer wall 120 that has an inner end 124 and an outer end 128 in the form of a flange. The aforementioned annular bead 92 (visible in FIG. 19) extends radially inward from outer wall 120 proximate to the inner end 124 for being received within the recess 88 (FIG. 9) to secure the closing element 56 together with the body 54. Furthermore, the aforementioned the gap 100 (visible in FIG. 20) is located on the outer wall 120 proximate to the inner end 124 to cooperate together with the key 96 on the closure body 54 (FIG. 13) to orient the closing element 56 rotationally about the axis 68 (FIG. 3) when the closing element 56 is assembled atop the body 54.

Still referring to FIGS. 16, 19, and 20, extending laterally inwardly from the outer wall 120 is a cup-like transverse cover 130 which functions to selectively occlude or expose a flow passage 132 (FIGS. 7, 8, and 10) through the body 54 of the closure 40, as will be discussed in greater detail below. The transverse cover 130 is connected to the outer wall 120 of the closing element 56 only about 260-270 degrees around the circumference of the outer wall 120. A tapered channel 132 (FIGS. 19 and 20) is defined in the space beneath the connection between the transverse cover 130 and the outer wall 120 for receiving the exterior surface 74 of the outlet end 64 of the dispensing spout 72 (as shown in FIGS. 7 and 8). The exterior surface 74 of the dispensing spout 72 is sealingly engaged by an outer end bead 136 (FIGS. 19 and 20) on the transverse cover 130 and an inwardly sloping interior surface 140 (FIGS. 19 and 20) on the outer wall 120.

Figure 17:
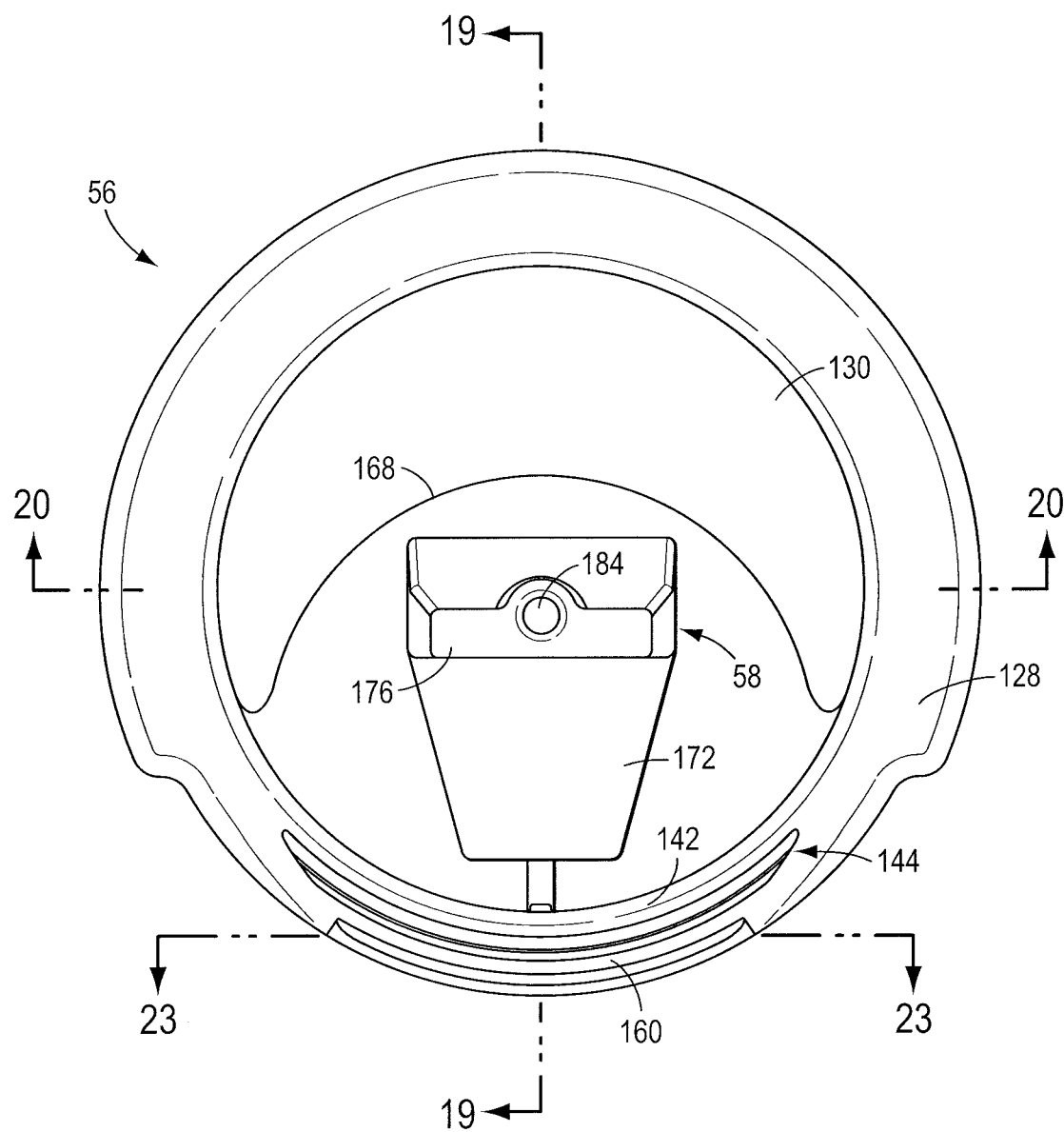
FIG. 17 is a front elevation view of only the closing element of the dispensing closure of FIG. 1.
Figure 18:
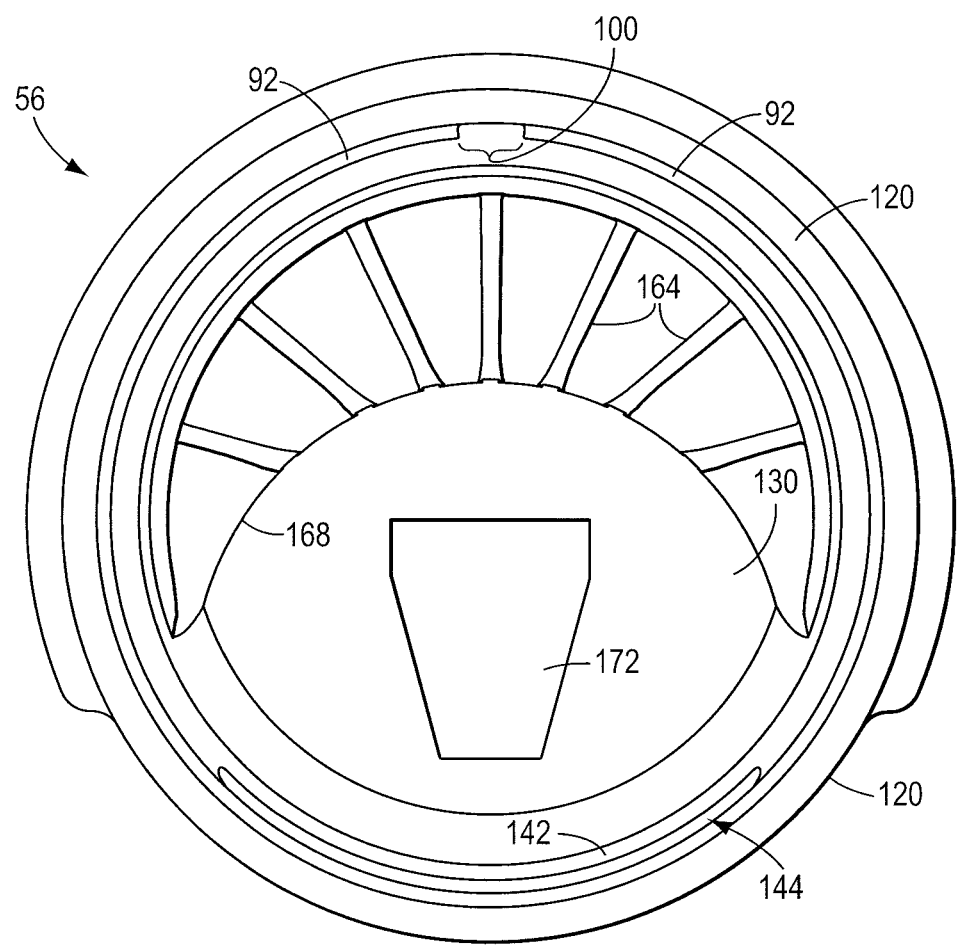
FIG. 18 is a rear elevation view of only the closing element of the dispensing closure of FIG. 1.

As can be seen in FIGS. 16, 18, and 19, a cantilevered sealing portion 142 of the transverse cover 130 is not directly connected to the outer wall 120, and is spaced from the outer wall 120 by an aperture 144 (FIG. 18). The aperture 144 is in the shape of a partial annulus and permits a portion of the cylindrical dispensing spout 72 to enter and to protrude through the closing element 56 (as shown in FIGS. 1 and 9). The aperture 144 extends between about 90 and 100 degrees around the circumference of the circular outer wall 120, when viewed from above in FIG. 17.

Figure 12:
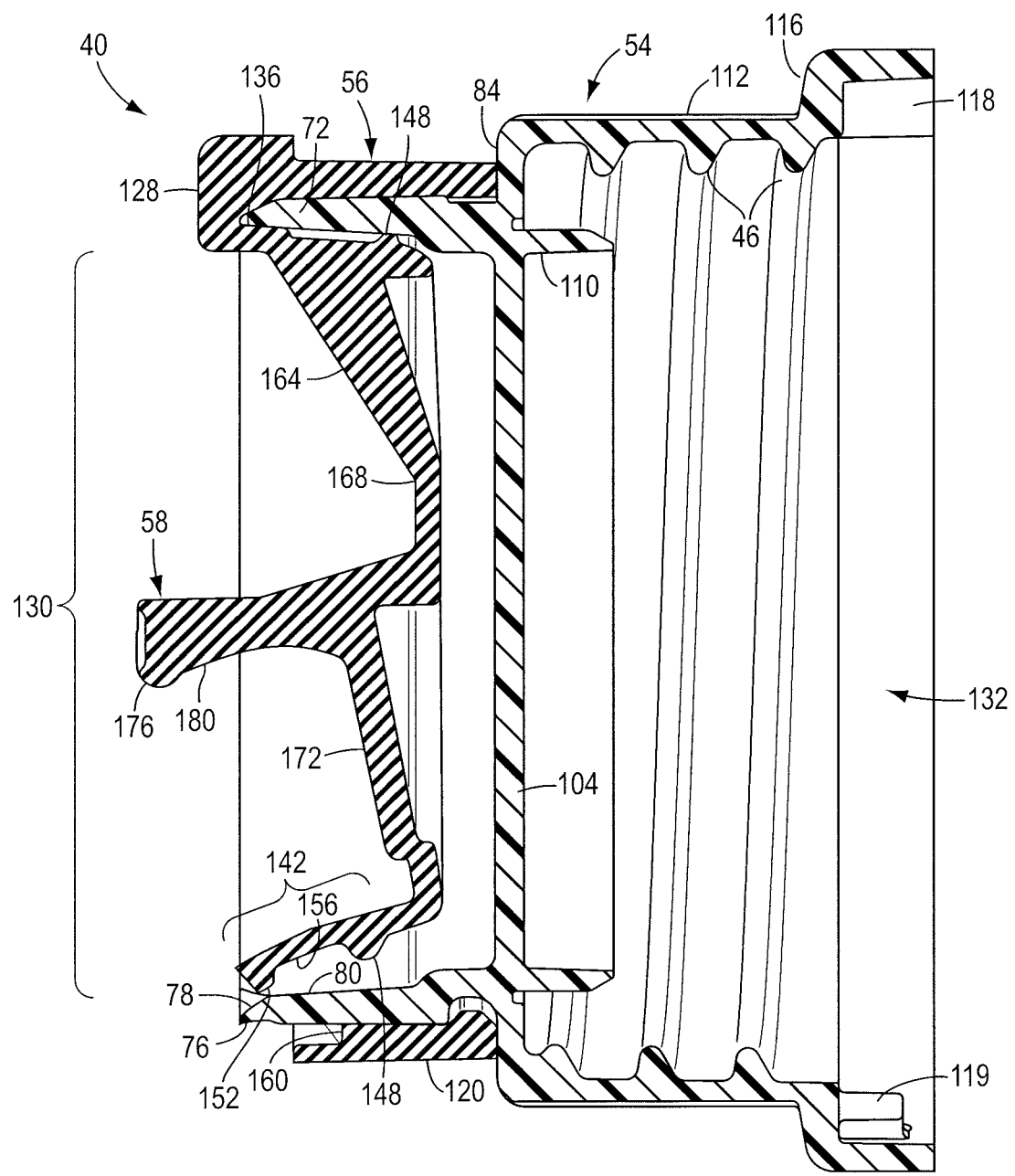
FIG. 12 is an enlarged, cross-sectional view of only the dispensing closure illustrated in FIG. 1, taken generally along the plane 8-8 in FIG. 6, but FIG. 11 shows the closing element moving from the open position toward the closed position and making initial contact with the body.
Figure 21:
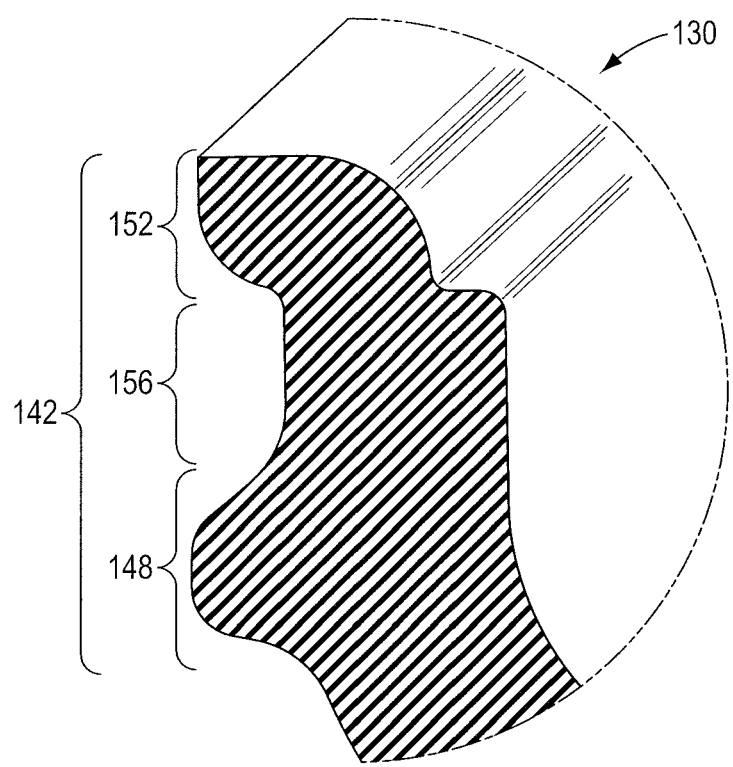
FIG. 21 is a greatly enlarged, fragmentary view of the portion of the dispensing closure enclosed in the circle designated as "FIG. 21" in FIG. 19.

As best shown in FIG. 21, the cantilevered sealing portion 142 of the transverse cover 130 includes a pair of projections or beads 148 and 152 in a spaced-apart relationship for contacting against the interior surface 80 of the dispensing spout 72 (as shown in FIG. 9). The axial innermost bead 148 on the sealing portion 142 functions as a sealing bead 148, which extends fully around the circumference of the transverse cover 130. The sealing bead 148 projects radially (i.e., laterally) outward from the transverse cover 130, generally in a plane that is normal to the central axis 68 (FIG. 3). As will be discussed in greater detail below, the sealing bead 148 sealingly engages the interior surface 80 of the dispensing spout 72 (as shown in FIG. 9) to prevent, or at least minimize, flow of a fluent substance through the dispensing closure 40 when the transverse cover 130 is in its substantially unstressed and normally closed position. The axial outermost bead 152 on the sealing portion 142 functions as a wiping bead 152. The wiping bead 152 projects radially (i.e., laterally) outward from the transverse cover 130 in a configuration that is somewhat parabolic or a similar conic section, which is most apparent in FIG. 22. As will be discussed in greater detail below, the wiping bead 152 initially contacts the interior surface 80 of the dispensing spout 72 (as shown in FIG. 12), when the transverse cover 130 moves from the open position (as illustrated in FIGS. 10 and 11) toward and to the closed position (as illustrated in FIGS. 8 and 9), to cut-off or wipe away fluent substance (which may remain after dispensing from the closure 40) from the interior surface 80 of the dispensing spout 72 proximate to the sloping pour surface 78 of the pour lip 76 (FIG. 12). In some embodiments of the present invention (not illustrated), the transverse cover 130 could be provided with multiple sealing beads 148 and/or multiple wiping beads 152 for an improved sealing or wiping functionality, depending on the application and the fluent substance to be dispensed.

Figure 22:
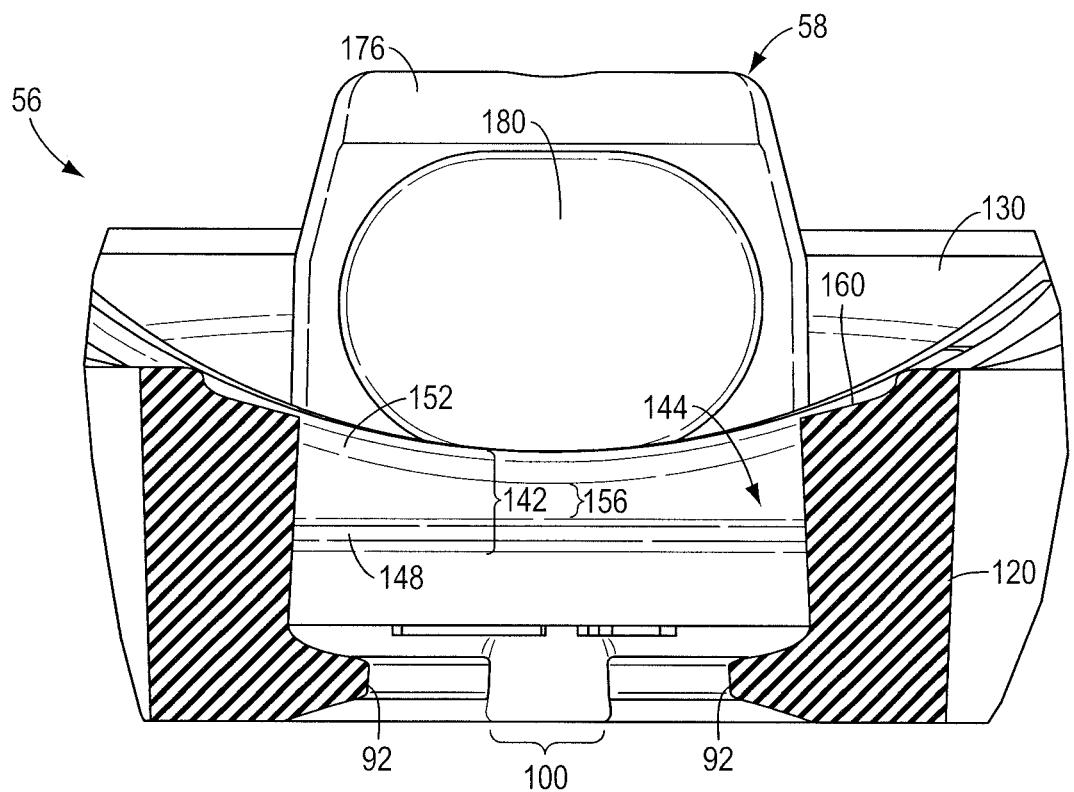
FIG. 22 is a fragmentary, cross-sectional view of only the closing element of the dispensing closure of FIG. 1, taken generally along the plane 22-22 in FIG. 19.

Referring now to FIGS. 21 and 22, the cantilevered sealing portion 142 of the transverse cover 130 includes a saddle-shaped recessed surface or fluent substance capture zone 156 extending between the sealing bead 148 and the wiping bead 152. As will be discussed in greater detail below, the recessed surface 156 functions to trap residual fluent substance that may remain on the interior surface 80 of the dispensing spout 72 subsequent to dispensing, and such trapping of the fluent substance minimizes or prevents unwanted drips and/or messy accumulation of the fluent substance on the dispensing spout 72.

Figure 6:
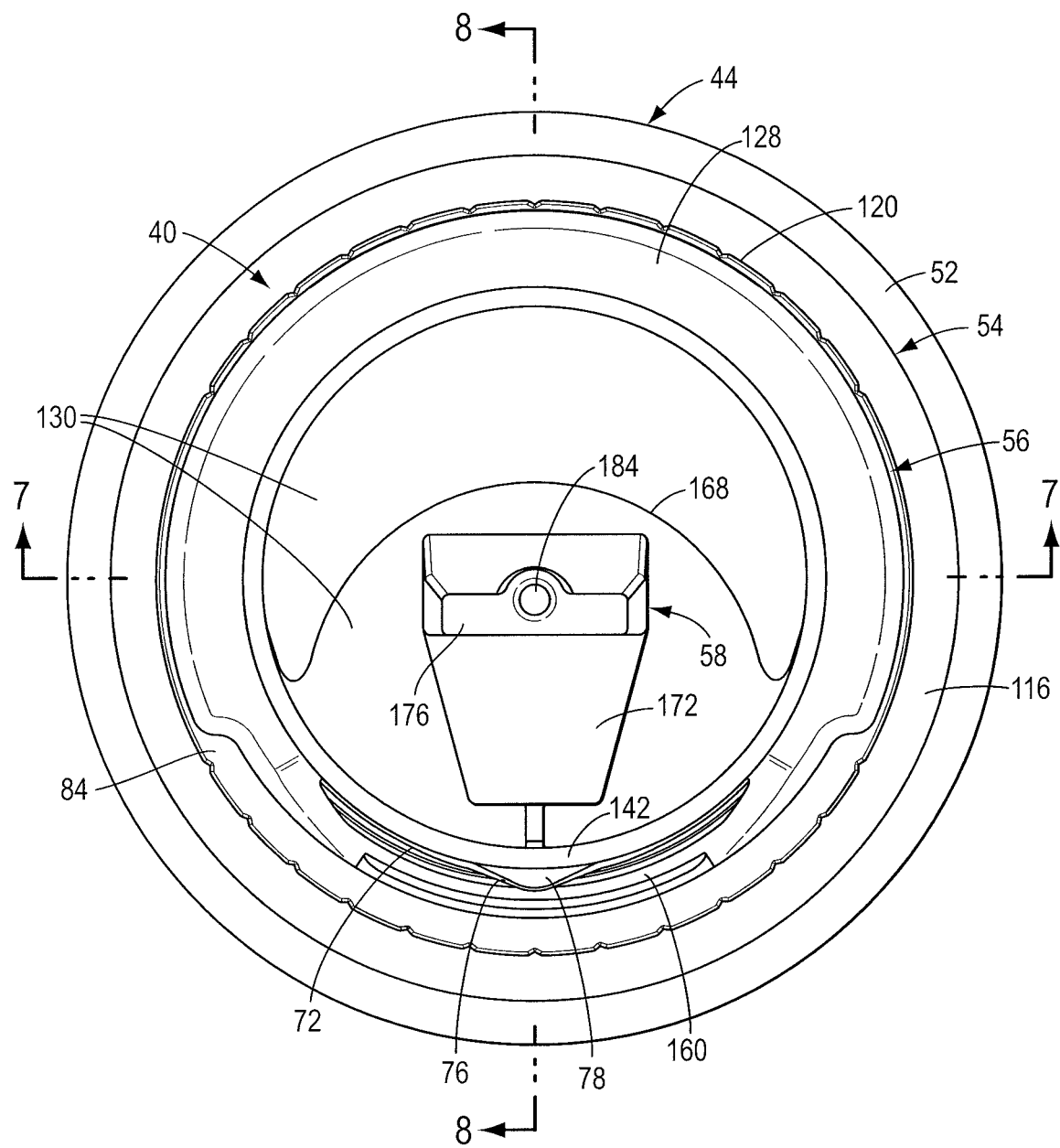
FIG. 6 is a front elevation view of only the dispensing closure and container illustrated in FIG. 1.
Figure 23:
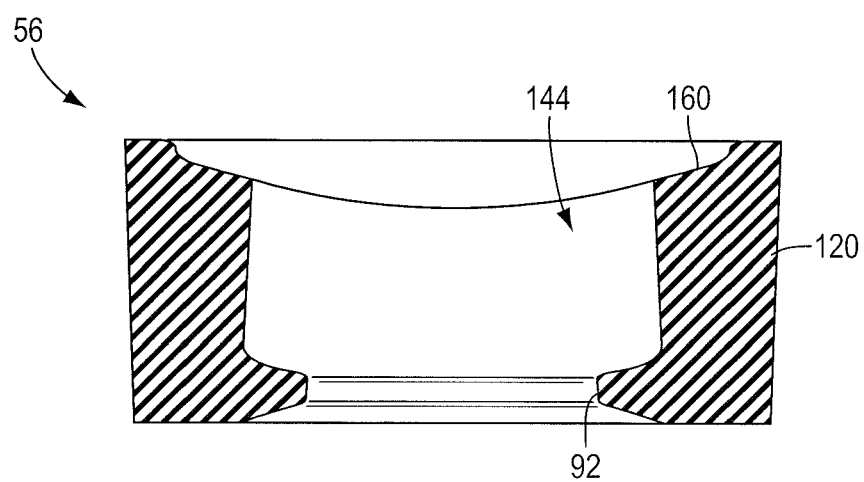
FIG. 23 is a cross-sectional view of only the closing element of the dispensing closure of FIG. 1, taken generally along the plane 23-23 in FIG. 17.

With reference now to FIGS. 19 and 23, the closing element has an arcuate and recessed ledge 160 that is located just radially outward of the recess 144, and thus is located radially outward of the dispensing spout 72 when the closing element 56 is installed or mounted overtop of the body 54 (as illustrated in FIGS. 6, 8, and 9). The space above the ledge 160 functions as a drip catcher in the event that any residual fluent substance drips, spills, or otherwise accumulates on the underside of the dispensing spout 72 after the fluent substance has been dispensed from the pour spout 76.

Referring next to FIGS. 18 and 19, the interior side of the transverse cover 130 is provided with seven radially and axially-extending ribs 164, which function to stiffen a rear portion of the transverse cover 130 that is opposite of the cantilevered sealing portion 142. Each of the ribs 164 has generally trapezoidal shape in transverse cross-section, with a narrow end terminating at a fold line, bend line, or pivot line 168 in the transverse cover 130, and a wide end located axially outward of the narrow end. As will be discussed in greater detail below, the pivot line 168 assists the cantilevered sealing portion 142 to rotate away from the dispensing spout 72 when the user of the closure 40 presses against the toggle tab 58 to move the cantilevered sealing portion 142 away from sealing contact with the interior surface 80 of the body 54.

With reference next to FIGS. 16, 17, and 19, the aforementioned toggle tab 58 has a complex structure that extends axially outward from a front and central region of the transverse cover 130. The portion of the toggle tab 58 that connects to the rest of the transverse cover 130 includes a raised, trapezoidal-shaped, inclined foot 172 extending laterally toward the cantilevered sealing portion 142. The narrow end of the foot 172 is located near the cantilevered sealing portion 142 and the wide end of the foot 172 connects to the protruding engagement portion 176 of the toggle tab 58. The engagement portion 176 includes a recessed surface 180 (visible in FIGS. 16 and 19) for receiving a thumb or finger 59 (such as is illustrated in FIGS. 10 and 11) of the user to actuate or open the closure 40. The engagement portion 176 includes a gate 184 (for molding the closing element 56) located at its axial outward end (visible in FIGS. 16 and 17). As will be discussed in greater detail below, the foot 172 functions to assist in the rotation of the cantilevered sealing portion 142 when the engagement portion 176 of the toggle tab 58 is pushed by a user to open the dispensing closure 40.

The closing element 56 is preferably molded unitarily from an elastomeric material in the unstressed, as-molded position illustrated in FIGS. 16-23. It will be understood that when the closing element 56 is mounted around the body 54 (as shown in FIGS. 1, 2, and 4-9), some portions of the closing element 56 will compress or otherwise deform to accommodate the rigid body 54. More specifically, the sealing bead 148 and the wiping bead 152 each interfere with the interior surface 80 of the dispensing spout 72 by about 0.25 mm when the transverse cover 130 is located in the closed position. Furthermore, the outer end bead 136 (FIGS. 5, 8, and 19) somewhat interferes with, and seals against, the exterior surface 74 of the dispensing spout 72 when the closing element 56 is mounted around the body 54.

The cup-like configuration of the transverse cover 130, which locates the toggle tab 58 between (i) the cantilevered sealing portion 142 on one side, and (ii) the pivot line 168 and the stiffened rear portion on the other side, facilitates a desirable rotation of the sealing portion 142 away from the pour lip 76. The user must hold and maintain the toggle tab 58 in the rotated position away from the pour lip 76, otherwise the stresses developed in the transverse cover 130 will force it to return automatically toward the as-molded unstressed condition, bringing the sealing portion 142 back into sealing contact with the interior of the dispensing spout 72. A spigot with a somewhat similar type of toggle tab or projection is disclosed in PCT publication no. WO 2006/086835 A1, which is incorporated herein in its entirety to the extent not in conflict with the discussion herein.

The inventors have found that the advantageous configuration of the dispensing closure 40 may provide a more controlled, cleaner dispensing of a fluent substance than the spigots, taps, or closures of the prior art, especially when the dispensing closure 40 is used to dispense a fluent substance having a viscosity between about 40 mPa·s (40 centipoise) and about 600 mPa·s (600 centipoise), such as liquid laundry detergent. The dispensing closure 40 has a desirable, self-cleaning type of cut-off when the toggle tab 58 is released by the user. Unlike the spigots and taps of the prior art discussed above, which typically dispense straight downward at a location that is out of the view of the user (i.e., visually blocked by the spout and/or the user's actuating hand), a fluent substance that is dispensed through the present invention dispensing closure 40 is typically visible to a user and flows out toward the user.

The inventors have further found that the arcuate pour surface 78 of the pour lip 76 of the dispensing closure 40 provides a cleaner dispensing of a fluent substance than the spigots, taps, and/or closures of the prior art, especially when the dispensing closure 40 is used to dispense a fluent substance having a viscosity between about 40 mPa·s (40 centipoise) and about 600 mPa·s (600 centipoise), such as liquid laundry detergent. It is believed that the arcuate pour surface 78 presents a reduced surface area to which the fluent substance may undesirably cling after dispensing from the closure 40. It is believed that this results in a reduction of the amount of residual fluent substance clinging to the pour surface 78. The reduction of residual fluent substance on the pour surface 78 of the dispensing spout 72 reduces drips and increases the likelihood that most, if not all, of fluent substance will be quickly dispensed (i) when the user is holding a dosing cup or other receptacle beneath the pour lip 76 while actuating the toggle tab 58, and (ii) just after the user ceases to actuate the toggle tab 58. The inventors have further found that the contact location of the wiping bead 152 (while wiping against the dispensing spout 72)—which is proximate to the merger of the drafted inside surface 80 and the arcuate pour surface 78—assists in the quick cut-off of the fluent substance.

The inventors have found that the dispensing closure 40 may be manufactured and/or assembled at a lower cost and/or more easily than the conventional spigots, taps, or closures of the prior art due to the small number of components requiring little assembly.

Furthermore, the configuration of the dispensing closure 40 can have a robust resistance to inadvertent opening or leakage through the closing element 56 during the shipping and handling of the dispensing closure 40 when attached to a container 44 of a fluent substance in the form of a package, whereby the package may be stored or transported in a number of orientations that may be subjected to a wide range of impulse forces or impact forces, internal hydraulic hammer forces from the fluent substance, vibrations, pressures, temperatures, and changes in orientation.

The inventors have found that the dispensing closure 40 may be more easily actuated than the spigots, taps, or closures of the prior art, especially some of the press-type tap of the prior art, which typically require a significantly greater force from a user to achieve actuation. For example, the inventors have found that the average peak force to fully open one commercially available press-type tap of the prior art is about 25.4 Newtons (5.7 pounds-force), and the average peak force to fully open the dispensing closure 40 is about 15.1 Newtons (3.4 pounds-force). The arrangement of the present invention toggle tab 58 relative to the cantilevered sealing portion 142 of the transverse cover 130 provides a lever-type mechanical advantage to assist in opening the dispensing closure 40 and accommodates a comfortable, one-handed operation by the user. Improved ease of use may be particularly desirable for the elderly or users with medical conditions, such as arthritis.

The detailed operation and function of the dispensing closure 40 will next be described with initial reference to FIG. 1. Typically, a user, such as a consumer, will encounter the dispensing closure 40 as shown in FIG. 1, with the dispensing closure 40 installed upon the outer end portion 50 of a container 44 of a fluent substance or product (e.g., liquid laundry detergent)—the closure 40, the container 44, and a fluent substance within the container 44 together defining a package. The package, as partially illustrated in FIGS. 1 and 2, is oriented in an inoperative, storage position for being placed on a store shelf, wherein the outer end portion 50 is located at the upper end of the container (opposite of the base or bottom of the container 44). The package would subsequently be re-oriented by the user about 90 degrees into an operative, dispensing position (such an orientation being illustrated in FIGS. 6-11) with the pour lip 76 facing downward to direct flow of the fluent substance both axially outward and toward the ground.

The container 44 may be provided with an optional dosing cup or cap (not illustrated) that may be friction fitted around either the body 54 or the container 44, and the dust cover would be removed by the user prior to the operation of the dispensing closure 40. After the removal of the dust cover, if provided, the user would encounter the transverse cover 130 of the closing element 56 oriented in the closed position relative to the body 54, such as is shown in FIGS. 1, 2, and 4-9. In this closed position, the transverse cover 130 is substantially unstressed, and the cantilevered sealing portion 142, including the sealing bead 148 and the wiping bead 152, is sealingly engaged with the inside surface 80 of the dispensing spout 72. This initial orientation of the transverse cover 130 minimizes the likelihood of inadvertent or premature opening of the closing element 56 relative to the body 54 during shipping or handling of the package, or when the package is subjected to higher pressures developed within the package as a result of temperature increases or impacts.

With reference to FIG. 8, it can be seen that with the transverse cover 130 of the closing element 56 oriented in the closed position, the engagement portion 176 of the toggle tab 58 projects axially outward beyond the outer end 128 of the closing element outer wall 120. With the closure 40 oriented such that the pour lip 76 faces downward, the concave, recessed surface 180 of the toggle tab 58 is also oriented downward, facing the pour lip 76. In this orientation of the closure 40, the recessed ledge 160 is located beneath, and axially inward, of the pour lip 76.

With reference now to FIGS. 10 and 11, the user can begin to move the cantilevered sealing portion 142 of the closing element 56 out of sealing engagement with the interior surface 80 (visible FIG. 11) of the dispensing spout 72 by pressing against the engagement portion 176 of the toggle tab 58 with a finger or thumb 59. In one preferred method of operation, the user would grip the closure 40 in the following manner: (i) placing his or her index and middle fingers (not illustrated) behind (i.e., axially inward of and against) the flange-like outer end 128 of the outer wall 120 (which is the fixed or stationary portion of the closing element 56); and (ii) lifting upwardly against the recessed surface 180 of the engagement portion 176 of the toggle tab 58 with his or her thumb 59 (which is the movable portion of the closing element 56). At a predetermined minimum force (pursuant to the manufacturer's design), the user overcomes the inherent stiffness of the transverse cover 130, thus allowing the elastic deformation of portions of the transverse cover 130. Specifically, when the inherent stiffness of the transverse cover 130 is overcome, the engagement portion 176 of the toggle tab 58 begins to rotate or pivot upwards, away from the pour lip 76, generally along the pivot line 168. The trapezoidal-shaped, inclined foot 172 is generally more rigid than the adjacent lateral portions of the transverse cover 130, and thus the foot 172 functions as lever arm that somewhat rigidly follows the rotation of the engagement portion 176 of the toggle tab 58. Movement of the foot 172 carries the cantilevered sealing portion 142 away from its sealing engagement with the dispensing spout 72 to open up the flow passage 132 through the body 54 and define a pour path PP (FIG. 11) for the fluent substance stored within the container 44 (not visible in FIGS. 10 and 11).

It can be seen in FIG. 8 that when the transverse cover 130 is located in the closed position, the cantilevered sealing portion 142 has a configuration that is substantially parallel to the axis 68, conforming to the interior surface 80 of the dispensing spout 72, and which is generally concave and cup-like when viewed from a position axially outward of the closing element 56 and looking axially inward toward the body 54. In contrast, it can be seen in FIGS. 10 and 11, that when the transverse cover 130 is located in the open position, the cantilevered sealing portion 142 has a rippled, wavelike configuration when viewed from a position axially outward of the closing element 56 and looking axially inward toward the body 54. However, when the sealing portion 142 is opened and is viewed in transverse cross-section through its center in FIG. 10 (which corresponds to a plane containing the axis 68 and passing through the middle/center of the pour lip 76), the sealing portion 142 has a somewhat straightened and slightly convex shape when viewed from a position axially outward of the closing element 56 and looking axially inward toward the body 54. In this same transverse cross-section shown in FIG. 10, the cantilevered sealing portion 142 opens between about 10 and 20 degrees relative to a plane that is normal to the axis 68. More preferably, the cantilevered sealing portion 142 opens about 15 degrees relative to a plane that is normal to the axis 68.

With reference now to FIGS. 10 and 11, the flow of a fluent substance through the opened closure 40 is restricted by the baffle 104 extending normal to the axis 68. Specifically, the apertures 108 (visible in FIG. 10) restrict the flow through the passage 132 to prevent or minimize either (i) jetting of the fluent substance past the transverse cover 130 in the open position, or (ii) hydraulic hammer which could prematurely force open the transverse cover 130 from the inside prior to being actuated by a user. It will be noted that in FIG. 11, the transverse cover 130 preferably does not touch the baffle 108 in the open position, does not block any of the apertures 108, and does not otherwise disrupt flow through the baffle 104.

The fluent substance within the container 44 will generally flow, due to the force of gravity acting on the substance, through the apertures 108 in the baffle 104, along the bottom sloping interior surface 80 of the dispensing spout 72, along the pour surface 78 of the pour lip 76, and out of the closure 40 to a target receptacle (such as a dosing cap). The recessed surface 160 that underlies the dispensing spout 72 may function to collect some amount of fluent substance that may adhere to the underside of the dispensing spout 72, and which might flow by surface tension to the recessed surface 160 and accumulate over time with repeated dispensing. Preferably, the recessed surface 160 would be a redundant feature, and would see little, if any, apparent collection of the fluent substance over the useful lifetime of the closure 40.

With reference now to FIG. 12 only, as the user releases the toggle tab 58, the resiliency of the deflected transverse cover 130 causes it to return to its normal state in the closed position. Between the open position and the closed position, the cantilevered sealing portion 142 of the transverse cover 130 makes initial contact with the dispensing spout 72. The wiping bead 152 initially contacts the dispensing spout 72 either (i) just at the location of transition/merger between the pour surface 78 of the pour lip 76 and the sloping interior surface 80 of the dispensing spout 72, or (ii) just axially inward of the location of the transition/merger between the pour surface 78 of the pour lip 76. The force and speed of the wiping bead 152 when moving to the dispensing spout 72 functions to cut the flow of the fluent substance through the passage 132, and as the wiping bead 152 continues to travel generally axially inward toward the closed position of the transverse cover 130, the wiping bead 152 pulls residual fluent substance axially inward back toward the interior of the container 44. Advantageously, some amount of such residual fluent substance may be trapped or swept into the space between the wiping bead 152, the seal bead 148, the recessed surface 156, and the interior surface 80 of the dispensing spout 72.

With reference to FIGS. 8, 9, and 12, the cantilevered sealing portion 142 continues to move axially inward toward the closed position of the transverse cover 130, contacting the interior surface 80 of the dispensing spout 72. Contact with the interior surface 80 causes the cantilevered sealing portion 142 to invert—moving from the configuration shown in FIGS. 10 and 11 to the concave, cup-like configuration shown in FIGS. 8 and 9. In the closed position, the sealing bead 148 re-establishes sealing contact fully around the interior surface 80 of the dispensing spout 72 and extends generally within a plane that is normal to the central axis 68. The wiping bead 152 also re-engages the interior surface 80 of the spout 72 with the transverse cover 130 in the closed position.

Depending on the materials and the thicknesses used, when the transverse cover 130 moves between the closed position and the open position, and vice versa, the transverse cover 130 may desirably produce an audible snap or click that indicates to a user of the dispensing closure 40 that it is open.

If desired, the dispensing closure 40 described above could be modified to provide tamper resistant features. For example, some portion of the closing element 56 or body 54 might be frangible and break upon the initial movement of the transverse cover 130 away from the dispensing spout 72 into the open position. Alternatively, a secondary seal, tape, or adhesive (not illustrated) may be provided across some portion of the transverse cover 130 to initially prevent the movement of the transverse cover 130 from the closed position to the open position.

According to another embodiment of the present invention (not illustrated), the transverse cover does not have a cantilevered sealing portion, and instead the transverse cover extends fully across the top end of the outer wall in the form of a continuous cup-like membrane that does not permit flow of a fluent substance directly out of the closure in a direction along the central axis of the body. The transverse cover would otherwise be the same as described above, with a wiping bead spaced axially outward of a sealing bead. In this alternate configuration, the flow of a fluent substance through the dispensing closure would be directed transversely through an aperture in the outer wall of the closing element. Furthermore, in this configuration the dispensing spout of the body would not extend axially through or beyond the transverse cover.

Figure 24:
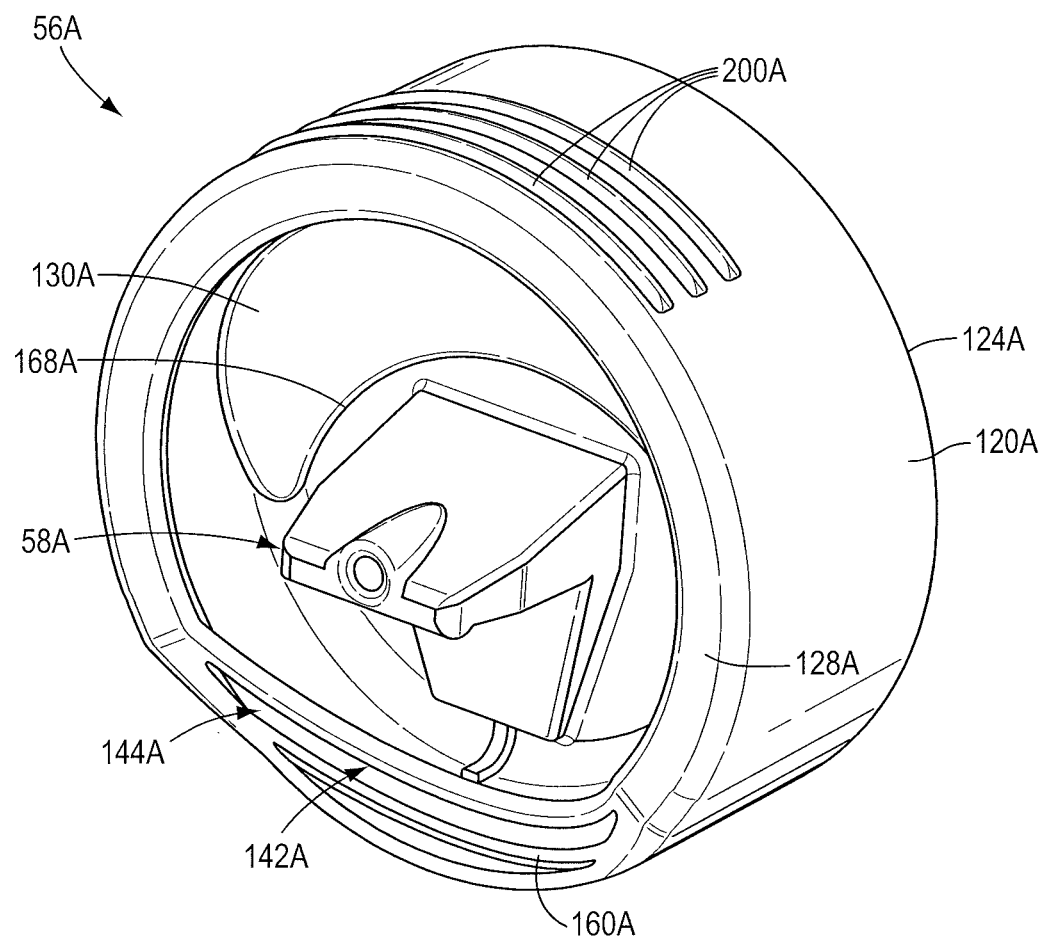
FIG. 24 is a perspective view, taken from above and in front, of only a closing element of a second embodiment of a dispensing closure of the present invention.

FIG. 24 illustrates a component of a second embodiment of the present invention, wherein only the closing element 56A component of the second embodiment of the inventive dispensing closure is illustrated. The closing element 56A functions generally in the same manner as the closing element 56 of the first illustrated embodiment of the dispensing closure 40. It will be appreciated that the closing element 56A is intended to be used with a body that is similar or identical to the body 54 of the first illustrated embodiment of the dispensing closure 40. The numbered features of the second embodiment of the closing element 56A illustrated in FIG. 24 are designated generally with the suffix letter "A" and are functionally analogous to features of the first embodiment of the closing element 56 that share the same number (without the suffix letter "A"). The detailed discussion above of such features of the first embodiment of the closing element 56 applies to the second embodiment of the closing element 56A, to the extent that such preceding discussion does not contradict the following discussion.

With reference to FIG. 24, the second embodiment of the closing element 56A differs from the first embodiment of the closing element 56 in that the second embodiment of the closing element 56A has an outer wall 120A with a partially annular top end 128A that does not have any radially extending flange for being gripped by a user to assist in opening of the closing element 56A relative to the body (not illustrated in FIG. 24) of the dispensing closure. The absence of a flange on the outer wall 120A may prevent or minimize the likelihood of the user inadvertently pulling the closing element 56A from its mounted position around the rigid body of the dispensing closure. Furthermore, the outer wall 120A includes a plurality of ridges or ribs 200A extending partially around the circumference of the outer wall 120A at a location that is opposite of the location of the cantilevered sealing portion 142A. In view of the absence of a flange extending from the outer wall 120A, the ridges 200A advantageously provide the user with an area of increased friction for gripping and actuating the closing element 56A to dispense a fluent substance through the dispensing closure.

It will be appreciated that while various theories and explanations have been set forth herein with respect to how the component configurations and arrangements may affect the operation of the inventive dispensing closures, there is no intention to be bound by such theories and explanations. Further it is intended that all structures falling within the scope of the appended claims are not to be otherwise excluded from the scope of the claims merely because the operation of such dispensing closures may not be accounted for by the explanations and theories presented herein.

Various modifications and alterations to this invention will become apparent to those skilled in the art without departing from the scope and spirit of this invention. Illustrative embodiments and examples are provided as examples only and are not intended to limit the scope of the present invention.

What is claimed is:

1. A dispensing closure for use with a container having an opening between an exterior of the container and an interior of the container where a fluent substance may be stored, said dispensing closure comprising:
   A. a body for being located at the opening of the container, said body having a dispensing spout defining an interior surface, said interior surface defining at least a portion of a passage for communicating with the container interior to permit the flow of a fluent substance through said body; and
   B. a closing element attached to said body, said closing element defining
      1. an outer wall mounted around at least a portion of said dispensing spout of said body, and
      2. a transverse cover that extends laterally inwardly from said outer wall and that has a closed position relative to said body and an actuated, open position relative to said body, said transverse cover having
         i. an outwardly projecting toggle tab for being engaged by a user to move said transverse cover from said closed position to said actuated, open position, and
         ii. a flexible, resilient cantilevered sealing portion spaced laterally from said outer wall to
            a. define an aperture for receiving said dispensing spout of said body, and
            b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; wherein said dispensing spout of said body further comprises at least one pour lip for directing flow of a fluent substance out of said dispensing closure, said at least one pour lip extending outwardly from said interior surface and projecting laterally relative to said interior surface to define at least part of a pour path; and wherein said dispensing spout is substantially cylindrical and said at least one pour lip extends between about 20 degrees and about 30 degrees around a circumference of said dispensing spout.

2. A dispensing closure for use with a container having an opening between an exterior of the container and an interior of the container where a fluent substance may be stored, said dispensing closure comprising:
   A. a body for being located at the opening of the container, said body having a dispensing spout defining an interior surface, said interior surface defining at least a portion of a passage for communicating with the container interior to permit the flow of a fluent substance through said body; and
   B. a closing element attached to said body, said closing element defining
      1. an outer wall mounted around at least a portion of said dispensing spout of said body, and
      2. a transverse cover that extends laterally inwardly from said outer wall and that has a closed position relative to said body and an actuated, open position relative to said body, said transverse cover having
  i. an outwardly projecting toggle tab for being engaged by a user to move said transverse cover from said closed position to said actuated, open position, and
  ii. a flexible, resilient cantilevered sealing portion spaced laterally from said outer wall to
    a. define an aperture for receiving said dispensing spout of said body, and
    b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; wherein said transverse cover has
      i. at least one sealing bead having a normally closed configuration sealing against said interior surface of said dispensing spout when said transverse cover is located in said closed position, and
      ii. at least one wiping bead spaced axially-outwardly from said at least one sealing bead when said transverse cover is located in said closed position, said at least one wiping bead wiping against said interior surface of said dispensing spout when said transverse cover moves from said actuated, open position to said closed position; and wherein said dispensing spout of said body further comprises at least one pour lip for directing flow of a fluent substance out of said dispensing closure, said at least one wiping bead is variably spaced from said at least one sealing bead, and said at least one wiping bead is minimally spaced from said at least one sealing bead at a location proximal to said at least one pour lip.

3. A dispensing closure for use with a container having an opening between an exterior of the container and an interior of the container where a fluent substance may be stored, said dispensing closure comprising:
  A. a body for being located at the opening of the container, said body having a dispensing spout defining an interior surface, said interior surface defining at least a portion of a passage for communicating with the container interior to permit the flow of a fluent substance through said body; and
  B. a closing element attached to said body, said closing element defining
    1. an outer wall mounted around at least a portion of said dispensing spout of said body, and
    2. a transverse cover that extends laterally inwardly from said outer wall and that has a closed position relative to said body and an actuated, open position relative to said body, said transverse cover having
      i. an outwardly projecting toggle tab for being engaged by a user to move said transverse cover from said closed position to said actuated, open position, and
      ii. a flexible, resilient cantilevered sealing portion spaced laterally from said outer wall to
        a. define an aperture for receiving said dispensing spout of said body, and
        b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; wherein said transverse cover has
          i. at least one sealing bead having a normally closed configuration sealing against said interior surface of said dispensing spout when said transverse cover is located in said closed position, and
          ii. at least one wiping bead spaced axially-outwardly from said at least one sealing bead when said transverse cover is located in said closed position, said at least one wiping bead wiping against said interior surface of said dispensing spout when said transverse cover moves from said actuated, open position to said closed position; and wherein said body defines a central axis, said at least one sealing bead generally extends along a plane that is normal to said axis when said transverse cover is located in said closed position, and said at least one wiping bead extends along a generally arcuate path outwardly of said plane when said transverse cover is located in said closed position.

4. A dispensing closure for use with a container having an opening between an exterior of the container and an interior of the container where a fluent substance may be stored, said dispensing closure comprising:
  A. a body for being located at the opening of the container, said body having a dispensing spout defining an interior surface, said interior surface defining at least a portion of a passage for communicating with the container interior to permit the flow of a fluent substance through said body; and
  B. a closing element attached to said body, said closing element defining
    1. an outer wall mounted around at least a portion of said dispensing spout of said body, and
    2. a transverse cover that extends laterally inwardly from said outer wall and that has a closed position relative to said body and an actuated, open position relative to said body, said transverse cover having
      i. an outwardly projecting toggle tab for being engaged by a user to move said transverse cover from said closed position to said actuated, open position, and
      ii. a flexible, resilient cantilevered sealing portion spaced laterally from said outer wall to
        a. define an aperture for receiving said dispensing spout of said body, and
        b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; and wherein said dispensing spout of said body further comprises at least one pour lip for directing flow of a fluent substance out of said dispensing closure, and said cantilevered sealing portion is located axially inward of said at least one pour lip when said transverse cover is located in said closed position.

5. A dispensing closure for use with a container having an opening between an exterior of the container and an interior of the container where a fluent substance may be stored, said dispensing closure comprising:
   A. a body for being located at the opening of the container, said body having a dispensing spout defining an interior surface, said interior surface defining at least a portion of a passage for communicating with the container interior to permit the flow of a fluent substance through said body; and
   B. a closing element attached to said body, said closing element defining
      1. an outer wall mounted around at least a portion of said dispensing spout of said body, and
      2. a transverse cover that extends laterally inwardly from said outer wall and that has a closed position relative to said body and an actuated, open position relative to said body, said transverse cover having
         i. an outwardly projecting toggle tab for being engaged by a user to move said transverse cover from said closed position to said actuated, open position, and
         ii. a flexible, resilient cantilevered sealing portion spaced laterally from said outer wall to
            a. define an aperture for receiving said dispensing spout of said body, and
            b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; wherein said transverse cover has at least one wiping bead for wiping against said interior surface of said dispensing spout when said transverse cover moves from said actuated, open position to said closed position; and wherein said dispensing spout of said body further comprises at least one pour lip for directing flow of a fluent substance out of said dispensing closure, said at least one wiping bead contacts said interior surface of said dispensing spout at a location that is axially inward of said at least one pour lip when said transverse cover moves from said actuated, open position to said closed position.

6. A dispensing closure for use with a container having an opening between an exterior of the container and an interior of the container where a fluent substance may be stored, said dispensing closure comprising:
   A. a body for being located at the opening of the container, said body having a dispensing spout defining an interior surface, said interior surface defining at least a portion of a passage for communicating with the container interior to permit the flow of a fluent substance through said body; and
   B. a closing element attached to said body, said closing element defining
      1. an outer wall mounted around at least a portion of said dispensing spout of said body, and
      2. a transverse cover that extends laterally inwardly from said outer wall and that has a closed position relative to said body and an actuated, open position relative to said body, said transverse cover having
         i. an outwardly projecting toggle tab for being engaged by a user to move said transverse cover from said closed position to said actuated, open position, and
         ii. a flexible, resilient cantilevered sealing portion spaced laterally from said outer wall to
            a. define an aperture for receiving said dispensing spout of said body, and
            b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; and wherein said dispensing spout of said body further comprises at least one pour lip for directing flow of a fluent substance out of said dispensing closure, said interior surface of said dispensing spout slopes linearly downwardly and inwardly, and said at least one pour lip has an arcuate pour surface that merges with said interior surface.

7. A dispensing closure for use with a container having an opening between an exterior of the container and an interior of the container where a fluent substance may be stored, said dispensing closure comprising:
   A. a body for being located at the opening of the container, said body having a dispensing spout defining an interior surface, said interior surface defining at least a portion of a passage for communicating with the container interior to permit the flow of a fluent substance through said body; and
   B. a closing element attached to said body, said closing element defining
      1. an outer wall mounted around at least a portion of said dispensing spout of said body, and
      2. a transverse cover that extends laterally inwardly from said outer wall and that has a closed position relative to said body and an actuated, open position relative to said body, said transverse cover having
         i. an outwardly projecting toggle tab for being engaged by a user to move said transverse cover from said closed position to said actuated, open position, and
         ii. a flexible, resilient cantilevered sealing portion spaced laterally from said outer wall to
            a. define an aperture for receiving said dispensing spout of said body, and
            b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; and wherein the dispensing closure is in combination with a container of a fluent substance having a viscosity between about 40 mPa·s and about 600 mPa·s, said dispensing closure, said container, and said substance together defining a package.

8. A dispensing closure for use with a container having an opening between an exterior of the container and an interior of the container where a fluent substance may be stored, said dispensing closure comprising:
- A. a body for being located at the opening of the container, said body having a dispensing spout defining an interior surface, said interior surface defining at least a portion of a passage for communicating with the container interior to permit the flow of a fluent substance through said body; and
- B. a closing element attached to said body, said closing element defining
  1. an outer wall mounted around at least a portion of said dispensing spout of said body, and
  2. a transverse cover that extends laterally inwardly from said outer wall and that has a closed position relative to said body and an actuated, open position relative to said body, said transverse cover having
     i. an outwardly projecting toggle tab for being engaged by a user to move said transverse cover from said closed position to said actuated, open position, and
     ii. a flexible, resilient cantilevered sealing portion spaced laterally from said outer wall to
        a. define an aperture for receiving said dispensing spout of said body, and
        b. seal against said interior surface of said dispensing spout with said transverse cover located in said closed position, whereby when said toggle tab is engaged by a user to move said transverse cover to said actuated, open position, then said cantilevered sealing portion is moved away from said interior surface to expose said passage; and wherein said body defines a central axis, and in which said spout is symmetrical about a first plane that contains said axis and bisects said spout, and when said transverse cover is in said actuated, open position, at least part of said cantilevered sealing portion opens at an angle between about 10 degrees and about 20 degrees relative to a second plane that is normal to said axis as measured in said first plane.

* * * * *